United States Patent
Behravan et al.

(10) Patent No.: US 9,974,073 B2
(45) Date of Patent: May 15, 2018

(54) METHODS AND NODES RELATING TO SYSTEM INFORMATION ACQUISITION DURING FLEXIBLE SUBFRAME OPERATION

(71) Applicant: Telefonaktiebolaget L M Ericsson (publ), Stockholm (SE)

(72) Inventors: Ali Behravan, Stockholm (SE); Muhammad Kazmi, Bromma (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 288 days.

(21) Appl. No.: 14/427,498

(22) PCT Filed: Jan. 29, 2015

(86) PCT No.: PCT/SE2015/050102
§ 371 (c)(1),
(2) Date: Mar. 11, 2015

(87) PCT Pub. No.: WO2015/115988
PCT Pub. Date: Aug. 6, 2015

(65) Prior Publication Data
US 2016/0262137 A1  Sep. 8, 2016

Related U.S. Application Data

(60) Provisional application No. 61/933,892, filed on Jan. 31, 2014.

(51) Int. Cl.
*H04W 72/04* (2009.01)
*H04W 36/00* (2009.01)
(Continued)

(52) U.S. Cl.
CPC ......... *H04W 72/044* (2013.01); *H04L 1/1812* (2013.01); *H04W 36/0088* (2013.01);
(Continued)

(58) Field of Classification Search
None
See application file for complete search history.

(56) References Cited

U.S. PATENT DOCUMENTS

2007/0254598 A1* 11/2007 Bachl ............... H04L 27/261
455/73
2013/0242816 A1* 9/2013 He ................... H04W 28/0268
370/280
(Continued)

FOREIGN PATENT DOCUMENTS

CN    102752862 A    10/2012
EP    2724561        4/2014
(Continued)

OTHER PUBLICATIONS

Unknown, Author, "Corrections to CGI Reading in Autonomous Gap", 3GPP TSG-RAN4 Meeting #69, R4-136144, Qualcomm Incorporated, San Francisco, California, USA, Nov. 11-15, 2013, 1-5.
(Continued)

*Primary Examiner* — Xavier Szewai Wong
(74) *Attorney, Agent, or Firm* — Murphy, Bilak & Homiller, PLLC

(57) ABSTRACT

The disclosure relates to a method performed in a wireless device located in a first cell operated by a network node of a wireless communication system. The method comprises acquiring (510) system information of a second cell using at least one autonomous gap during a time period. The wireless device is configured with a flexible subframe allocation scheme in the first cell during at least a part of the time
(Continued)

period. The method further comprises obtaining (520) a value Nmin corresponding to a minimum number of uplink feedback signals, where the value Nmin is associated with the flexible subframe allocation scheme. The method also comprises transmitting (530) at least the minimum number Nmin of uplink feedback signals in response to downlink data during the time period. The disclosure also relates to a method in the network node and to the wireless device and the network node.

44 Claims, 7 Drawing Sheets

(51) Int. Cl.
*H04L 1/18* (2006.01)
*H04W 48/08* (2009.01)
*H04W 72/12* (2009.01)

(52) U.S. Cl.
CPC ....... *H04W 48/08* (2013.01); *H04W 72/0413* (2013.01); *H04W 72/1263* (2013.01)

(56) References Cited

U.S. PATENT DOCUMENTS

| | | | |
|---|---|---|---|
| 2013/0272170 A1* | 10/2013 | Chatterjee | H04W 28/02 370/280 |
| 2013/0322343 A1 | 12/2013 | Seo et al. | |
| 2014/0204811 A1* | 7/2014 | Lu | H04L 1/1861 370/280 |
| 2014/0341051 A1* | 11/2014 | Gaal | H04W 24/10 370/252 |
| 2015/0173066 A1* | 6/2015 | Gao | H04L 1/1671 370/329 |
| 2015/0312937 A1* | 10/2015 | Suzuki | H04W 72/0446 370/255 |

FOREIGN PATENT DOCUMENTS

| | | |
|---|---|---|
| RU | 2012104689 | 8/2013 |
| WO | 2008156412 | 12/2008 |
| WO | 2012177203 A1 | 12/2012 |
| WO | 2013172757 A1 | 11/2013 |

OTHER PUBLICATIONS

Unknown, Author, "Further analysis of the impact of eIMTA on RRM requirements", 3GPP TSG-RAN WG4 Meeting #69, R4-136051, Ericsson, San Francisco, California, USA, Nov. 11-15, 2013, 1-4.

Unknown, Author, "CR on RRM requirements for dynamic TDD", 3GPP TSG-RAN4 Meeting #70 R4-140774 Prague, Czech Republic Change Request 36.133 CR 2228 Current version: 12.2.0 Source: Ericsson, Feb. 10-14, 2014, 1-6.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.2.0, Dec. 2013, 1-589.

Unknown, Author, "New work item proposal for Further Enhancements to LTE TDD for DL-UL Interference Management and Traffic Adaptation—Feature Part", 3GPP TSG-RAN Meeting #58, RP-121772, CATT, Barcelona, Spain, Dec. 4-7, 2012, 1-5.

Unknown, Author, "New work item proposal for Further Enhancements to LTE TDD for DL-UL Interference Management and Traffic Adaptation—Performance Part", 3GPP TSG-RAN Meeting #58, RP-121772, CATT, Barcelona, Spain, Dec. 4-7, 2012, 1-4.

Unknown, Author, "New work item proposal for Further Enhancements to LTE TDD for DL-UL Interference Management and Traffic Adaptation—Core Part", 3GPP TSG-RAN Meeting #58, RP-121772, Barcelona, Spain, Dec. 4-7, 2012, 1-6.

\* cited by examiner

METHODS AND NODES RELATING TO SYSTEM INFORMATION ACQUISITION DURING FLEXIBLE SUBFRAME OPERATION

TECHNICAL FIELD

Embodiments herein relate to wireless communication systems, such as telecommunication systems. A method and a wireless device for managing uplink (UL) feedback during System Information (SI) acquisition when flexible subframe operation is configured as well as a method and a network node for assisting the wireless device to manage UL feedback during SI acquisition when flexible subframe operation is configured are disclosed. Moreover, corresponding computer programs and computer program products are disclosed.

BACKGROUND

Within a telecommunication system, it is possible to apply a flexible subframe scheme in order to better adapt the number of UL and downlink (DL) subframes to current traffic conditions. E.g. when there is mostly DL traffic, it is preferred to use a scheme with many DL subframes.
Flexible Subframes in Dynamic Time Division Duplex In a dynamic Time Division Duplex (TDD) system, a group of subframes are fixed subframes, i.e. they are either UL or DL subframes in all radio frames, while others are flexible subframes, i.e. in some radio frames they can be UL subframe, while in other radio frames same subframe can be DL subframes or even special subframes. The assignment of the UL or DL direction is done in a dynamic manner on the basis of a radio frame or multiple radio frames. Flexible subframes are also interchangeably called dynamic subframes.

Table 1 shows the existing TDD configurations (also known as UL-DL configurations or TDD UL-DL configurations).

TABLE 1

| UL-DL configurations | | | | | | | | | | | |
|---|---|---|---|---|---|---|---|---|---|---|---|
| UL-DL configuration | DL-to-UL Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1a shows as an example of a dynamic TDD configuration made from two legacy TDD configurations (configuration 0 and 2). The TDD configuration is also called UL/DL subframe configuration.
Configuration of Flexible Subframes A flexible subframe is configured in a cell and the UEs are also informed about the flexible subframes by means of signaling. A subframe is in this document referred to as flexible if it is an UL subframe in one TDD configuration and a DL or special subframe in a second TDD configuration. More specifically a subframe can be a flexible subframe if it is an UL subframe in one TDD configuration and a DL or a special subframe in another TDD configuration. A subframe can also be flexible if it is an UL subframe in one TDD configuration and a DL subframe in a second TDD configuration. The first and second TDD configurations can be used in different radio frames in the same cell or in different cells during the same or different radio frames. A TDD configuration may also interchangeably be called an UL-DL configuration or a special subframe configuration.

The two configurations may either be the configuration used for UL scheduling and Hybrid Automatic Repeat Request (HARQ) timing and the configuration used for DL HARQ timing. It could otherwise be based on fixed configurations, e.g. configuration 0 and 5 in Table 1. In this example (configuration 0 and 5) subframes {3, 4, 7, 8, 9} would be flexible.

It is currently being discussed in 3GPP that the TDD configuration that will be applied for a period of time, e.g. a period of 10, 20, 40, 80 ms, is communicated to the UE by means of DL Control Information (DCI) format 1C. The UE may need to apply this configuration from the current radio frame or in any following radio frame.
Flexible Subframes in Half Duplex Operation In half duplex (HD), or more specifically in HD Frequency Division Duplex (HD-FDD), the UL and DL transmissions take place on different paired carrier frequencies but not simultaneously in time in the same cell. This means the UL and DL transmissions take place in different time slots or subframes. In other words UL and DL subframes do not overlap in time. The number and location of subframes used for DL, UL and subframes that are unused can vary on the basis of a radio frame or multiple radio frames. For example in one frame (say frame#1) subframes 9, 0, 4 and 5 are used for DL and subframes 2, 5 and 7 are used for UL transmission. But in another frame (say frame#2) subframes 0 and 5 are used for DL and subframes 2, 3, 5, 7, and 8 are used for UL transmission. Some subframes are unused to account for switching between UL and DL subframes. In this example subframe 3, 4, 8 and 9 can be considered as flexible subframes since they change between UL, DL and unused subframes across radio frames #1 and #2.
SI Acquisition Using Autonomous Gaps In High Speed Packet Access (HSPA) and Long Term Evolution (LTE) the serving cell can request the UE to acquire the SI of the target cell. More specifically the SI is read by the UE to acquire the cell global identifier (CGI), which uniquely identifies the target cell.

The UE reads the SI of the target cell (e.g. intra-, inter-frequency or inter-RAT cell) upon receiving an explicit request from the serving network node via Radio Resource Control (RRC) signaling e.g. from a Radio Network Controller (RNC) in HSPA or eNode B in case of LTE. The acquired SI is then reported to the serving cell. The signaling messages are defined in the relevant HSPA and LTE specifications.

In LTE the UE has to read the master information block (MIB) and SI block#1 (SIB1) of the target Evolved Universal Terrestrial Radio Access Network (E-UTRAN) cell (which can be FDD or TDD) to acquire its CGI (also known as E-UTRAN CGI(ECGI)) when the target cell is E-UTRAN intra- or inter-frequency. The MIB and SIB1 are sent on the Physical Broadcast Channel (PBCH) and Physical Downlink Shared Channel (PDSCH) respectively over pre-defined scheduling instances.

In order to acquire the SI which contains the CGI of the target cell, the UE has to read at least part of the SI including master information block (MIB) and the relevant SI block (SIB) as described later. The terms SI reading/decoding/acquisition, CGI/ECGI reading/decoding/acquisition, CSG SI reading/decoding/acquisition are sometimes interchangeably used. For consistency the broader term "SI reading or acquisition" is used.

The reading of SI for the acquisition of CGI is carried out during measurement gaps which are autonomously created by the UE. The number of gaps and their size thus depends upon UE implementation as well as on other factors such as the radio conditions, or type of SI to be read.

For TDD intra-frequency measurements, if autonomous gaps are used for reporting CGI, the UE may be required to be able to identify a new CGI of E-UTRA cell within $T_{identify\_CGI, intra} = T_{basic\_identify\_CGI, intra}$ ms, where $T_{basic\_identify\_CGI, intra}$ is the maximum allowed time for the UE to identify a new CGI of an E-UTRA cell. $T_{basic\_identify\_CGI, intra}$ is equal to 150 ms. This requirement applies when no Discontinuous Reception (DRX) is used.

If there is continuous DL data allocation and no DRX is used and no measurement gaps are configured, then the UE shall be able to transmit at least the number of Acknowledgements/non-acknowledgements (ACK/NACKs) stated in the following Table 2 during the identification of a new CGI of a E-UTRA cell. The continuous transmission herein means that the network node transmits data in all DL subframes during the $T_{basic\_identify\_CGI, intra}$.

TABLE 2

Requirement on minimum number of ACK/NACKs to transmit during $T_{basic\_identify\_CGI, intra}$

| UL/DL configuration | Minimum number of transmitted ACK/NACKs |
|---|---|
| 0 | 18 |
| 1 | 35 |
| 2 | 43 |
| 3 | 36 |
| 4 | 39 |
| 5 | 42 |
| 6 | 30 |

Problem

The UE acquires the SI of a non-serving cell in autonomous gaps. During the autonomous gaps the UE does not receive and transmit in a serving cell and can thus not receive any type of serving signal including SI of the serving cell. This is because the UE can decode only one physical channel (e.g. PBCH, PDSCH) at a time, and the SI is transmitted on PBCH and PDSCH.

In existing LTE TDD solutions, the UE is required to meet pre-defined SI reading requirements, which are specified and applicable under static TDD configuration. In this case the same TDD configuration is used in all cells on the serving and non-serving carriers over the entire period (T0) during which the SI is acquired by the UE.

In order to ensure certain minimum serving cell performance the pre-defined SI reading requirements also require the UE to send at least certain number of ACK/NACK during T0 in response to continuous DL data transmission. In static TDD the HARQ timing is fixed and the requirement in terms of the number of ACK/NACK to be transmitted is also fixed and depends on the TDD configuration.

However, in a system with flexible subframe operation such as in dynamic TDD or in HD-FDD the direction of subframe can change quickly, sometimes as fast as every radio frame. In this case, the UE behavior in terms of transmitting the minimum number of ACK/NACK during T0 is unspecified. This means that with flexible subframe operation the UE will not be compliant to any requirements, thus leading to one or more of the following problems:

Degradation of serving cell performance in terms of receiving and transmitting data during the SI acquisition;

Loss of scheduling grant sent by the network node since UE may not be able to use it; and Degradation in SI reading performance or failure to acquire the SI in case the UE creates fewer than necessary autonomous gaps during T0.

SUMMARY

An object may be to alleviate or at least reduce one or more of the above mentioned problems. This object and others are achieved by methods, the wireless device and the network node according to the independent claims, and by the embodiments according to the dependent claims.

According to a first aspect, the object is achieved by a method, performed by a wireless device or User Equipment (UE), for managing UL feedback during system information acquisition when flexible subframe operation is configured. A method, performed in the wireless device located in a first cell operated by a network node of a wireless communication system is provided, and comprises acquiring system information of a second cell using at least one autonomous gap during a time period. The wireless device is configured with a flexible subframe allocation scheme in the first cell during at least a part of the time period. The method further comprises obtaining a value Nmin corresponding to a minimum number of UL feedback signals, where the value Nmin is associated with the flexible subframe allocation scheme. The method also comprises transmitting at least the minimum number Nmin of UL feedback signals in response to DL data during the time period.

According to a second aspect, the object is achieved by a wireless device which, when located in a first cell operated by a network node of a wireless communication system, is configured to acquire system information of a second cell using at least one autonomous gap during a time period. The wireless device is configured with a flexible subframe allocation scheme in the first cell during at least a part of the time period. The wireless device is also configured to obtain a value Nmin corresponding to a minimum number of UL feedback signals, where the value Nmin is associated with the flexible subframe allocation scheme. The wireless device is further configured to transmit at least the minimum number Nmin of UL feedback signals in response to DL data during the time period.

According to a third aspect, the object is achieved by a method, performed by a network node, for assisting a wireless device to manage UL feedback during system information acquisition when flexible subframe operation is configured. A method performed in the network node of a wireless communication system operating a first cell is provided. A wireless device is served by the first cell. The method comprises transmitting configuration information to the wireless device configuring the wireless device to operate with a flexible subframe allocation scheme in the first cell during at least part of a time period during which the wireless device acquires system information of a second cell. The method also comprises obtaining a value Nmin associated with the flexible subframe allocation scheme, the value Nmin corresponding to a minimum number of UL feedback signals that the wireless device shall transmit in response to DL data during the time period. The method further comprises transmitting DL data to the wireless device in the first cell during the time period, and receiving at least the minimum number Nmin of UL feedback signals in the first cell in response to the transmitted DL data.

According to a fourth aspect, the object is achieved by a network node for a wireless communication system configured to operate a first cell. A wireless device is served by the first cell. The network node is further configured to transmit configuration information to the wireless device configuring the wireless device to operate with a flexible subframe allocation scheme in the first cell during at least part of a time period during which the wireless device acquires system information of a second cell. The network nodes is also configured to obtain a value Nmin associated with the flexible subframe allocation scheme, the value Nmin corresponding to a minimum number of UL feedback signals that the wireless device shall transmit in response to DL data during the time period. Further, the network node is configured to transmit DL data to the wireless device in the first cell during the time period, and receive at least the minimum number Nmin of UL feedback signals in the first cell in response to the transmitted DL data.

According to further aspects, the object is achieved by computer programs and computer program products corresponding to the aspects above.

An advantage of the different aspects above is that the serving cell performance is guaranteed during the time period when the UE acquires system information even if flexible subframe configuration is used. The performance is guaranteed in terms of a certain minimum number of DL subframes in which the UE can receive data from the serving cell.

Another advantage of the different aspects above is that the UE behavior in terms of the capability of transmitting minimum number of ACK/NACK in response to continuous DL data transmission is specified and is clear during the time period when the UE acquires SI even if flexible subframe configuration is used.

Other advantages are that the network node may better utilize the scheduling grant when the UE acquires the SI of a cell, the acquisition of the SI of the second cell may be accurately performed during a pre-defined time, and the UE is enabled to create only necessary number of autonomous gaps for acquiring SI during the time period.

BRIEF DESCRIPTION OF THE DRAWINGS

The various aspects of embodiments disclosed herein, including particular features and advantages thereof, will be readily understood from the following detailed description and the accompanying drawings.

DETAILED DESCRIPTION

Figure 1A:
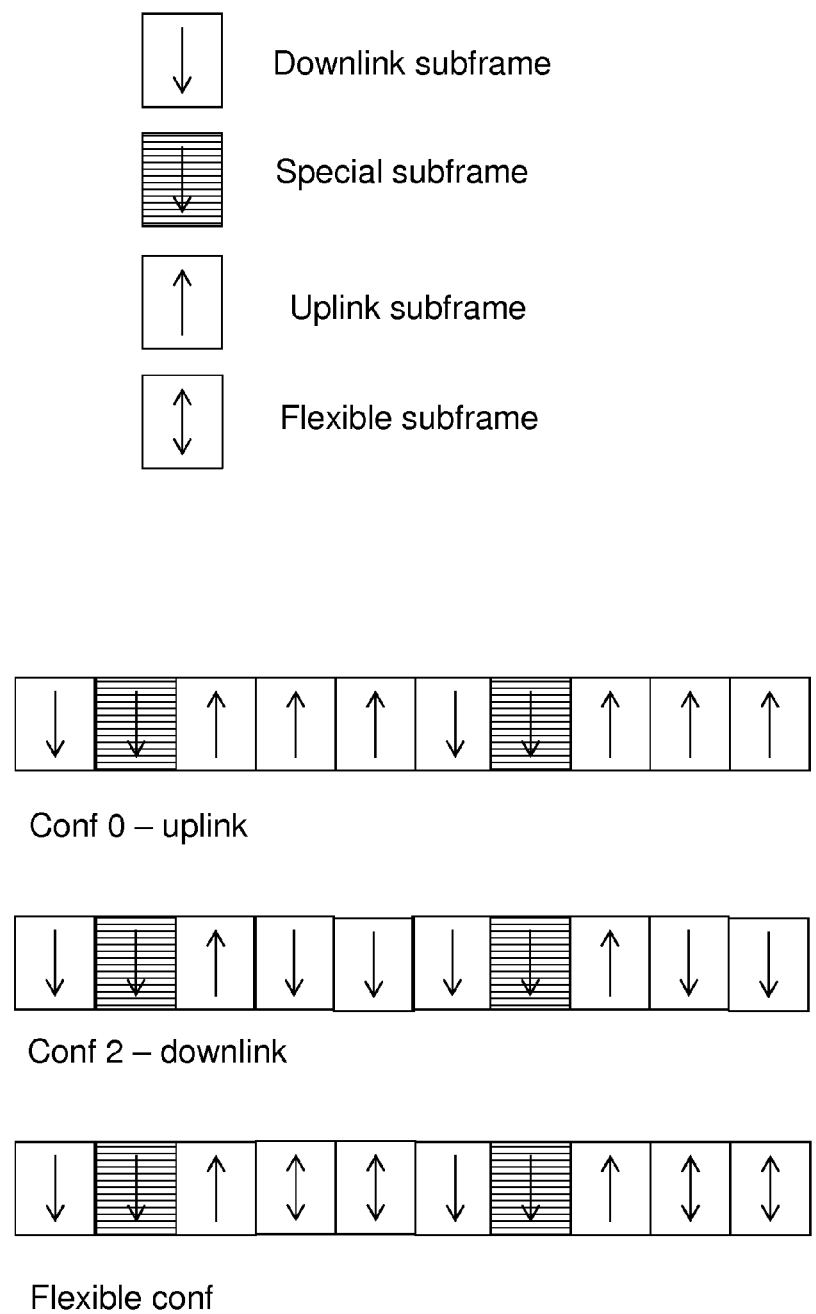
FIG. 1a is a schematic illustration of a dynamic TDD configuration made from two legacy TDD configurations.

In embodiments of the invention, the problem of degraded serving cell performance in terms of receiving and transmitting data during the SI acquisition, which occurs when a wireless device is configured with a flexible subframe allocation scheme, is addressed by a solution where the wireless device transmits at least a minimum number Nmin of UL feedback signals in response to DL data in the time period during which the wireless device acquires the SI. The value Nmin is associated with the flexible subframe allocation scheme that the wireless device is configured with and can thus be obtained by the wireless device as well as by the network node serving the wireless device. The value Nmin may thus be set such that the serving cell performance can be guaranteed at a certain level. The performance is guaranteed in terms of a certain minimum number of DL subframes in which the UE can receive data from the serving cell in the time period during which the wireless device uses autonomous gaps to acquire SI of another cell.

In order to further explain the problem of prior art, it is noted that according to TS 36.133 Rel-12, version 12.2.0, the UE shall identify and report the CGI when requested by the network for measurement with the purpose of 'reportCGI'. The UE may make autonomous gaps in DL reception and UL transmission for receiving MIB and SIB1 messages.

The following may be concluded from section 8.1.2.2.4 of TS 36.133 "*E-UTRA TDD intra-frequency measurement with autonomous gap*": In case of intra-frequency measurement the UE may be required to be able to identify a new CGI of an E-UTRA cell within $T_{identify\_CGI,\ intra} = T_{basic\_identify\_CGI,\ intra}$, where $T_{basic\_identify\_CGI,\ intra} = 150$ ms. This means that the Reference Signal Received Power (RSRP) may be required to fulfill certain side conditions. In addition to the above requirements on the maximum time for identifying the CGI and on the fulfillment of side conditions for the RSRP, a UE is required to transmit a certain number of ACK/NACK during $T_{identify\_CGI,\ intra}$ ms. This number depends on the TDD UL/DL configuration and is shown in Table 2 in the background section.

However in dynamic TDD, different radio frames may have different TDD configurations and therefore the above requirement that the UE has to transmit a number of ACK/NACK during $T_{identify\_CGI,\ intra}$ ms that depends on the TDD UL/DL configuration cannot apply. Therefore, in the case of dynamic TDD, the requirement on how many ACK/NACK the UE has to transmit during $T_{identify\_CGI,\ intra}$ ms, will be to transmit at least the number of ACK/NACKs that is related to the TDD configuration with the minimum number of DL subframes which is the TDD configuration 0 (see Table 1 in the background section). Therefore in case of dynamic TDD the UE shall be able to transmit at least 18 ACK/NACKs, which is indicated as the minimum number of ACK/NACKs for TDD configuration 0 in Table 2 of the background section. The conclusion is that in case of dynamic TDD, for intra-frequency measurements with autonomous gap, the UE shall be able to transmit at least 18 ACK/NACKs during $T_{identify\_CGI,\ intra}$ ms.

Similarly to intra-frequency measurement with autonomous gap, the following may be concluded from section 8.1.2.3.6 and 8.1.2.3.7 of TS 36.133: "TDD-TDD and TDD-FDD inter-frequency measurement with autonomous gap", for inter-frequency measurements. If autonomous gaps are used for measurement with the purpose of 'reportCGI', the UE shall be able to identify a new CGI of E-UTRA cell within $T_{identify\_CGI,\ inter} = T_{basic\_identify\_CGI,\ inter}$ ms, where $T_{basic\_identify\_CGI,\ inter} = 150$ ms.

This means that the RSRP may be required to fulfill certain side conditions. In addition to the above requirements on the maximum time for identifying the CGI and on the fulfillment of side conditions for the RSRP, a UE is required to transmit 30 ACK/NACK during $T_{identify\_CGI,\ inter}$ ms. This requirement has been set based on TDD configuration 1 as it is a common configuration. However in dynamic TDD different radio frames may have different TDD configurations and therefore the above requirement based on TDD configuration 1 cannot apply. Therefore, in the case of dynamic TDD, the requirement on how many ACK/NACK the UE has to transmit during $T_{identify\_CGI,\ inter}$ ms, will be to transmit at least the number of ACK/NACKs that is related to the TDD configuration with the minimum number of DL subframes which is the TDD configuration 0 (see Table 1 in the background section). Therefore in case of dynamic TDD the UE shall be able to transmit at least 18 ACK/NACKs, which is indicated as the minimum number of ACK/NACKs for TDD configuration 0 in Table 2 of the background section. The conclusion is that in case of dynamic TDD, and for TDD-TDD and TDD-FDD inter-frequency measurements with autonomous gap, the UE shall be able to transmit at least 18 ACK/NACKs during $T_{identify\_CGI,\ inter}$ ms.

Hence, in example embodiments relating to Radio Resource Management (RRM) requirements for Enhanced Interference Mitigation & Traffic Adaptation (eIMTA), where eIMTA is a flexible TDD subframe allocation scheme that has been defined by 3GPP, the following conclusions have been made:
In case of dynamic TDD, for intra-frequency measurements with autonomous gap, the UE shall be able to transmit at least 18 ACK/NACKs (as an example of Nmin) during $T_{identify\_CGI,\ intra}$ ms.
In case of dynamic TDD, for TDD-TDD and TDD-FDD inter-frequency measurements with autonomous gap, the UE shall be able to transmit at least 18 ACK/NACKs (as an example of Nmin) during $T_{identify\_CGI,\ inter}$ ms.

Throughout the following description similar reference numerals have been used to denote similar elements, units, modules, circuits, nodes, parts, items or features, when applicable. In the figures, features that appear only in some embodiments are indicated by dashed lines.

Figure 1B:
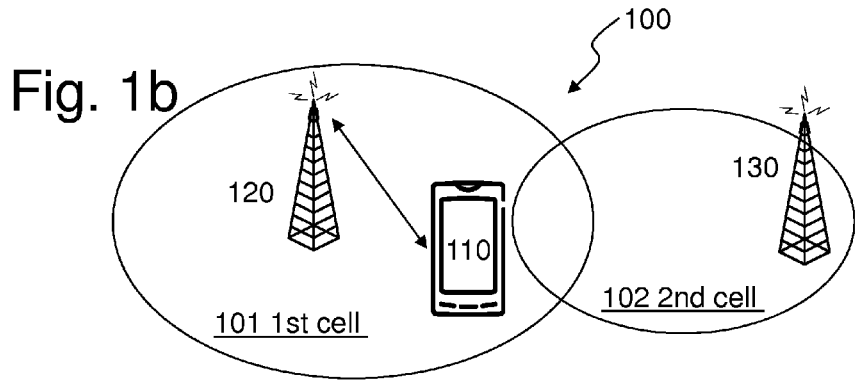
FIG. 1b is a schematic illustration of an exemplifying wireless communications system 100 in which embodiments herein may be implemented.

FIG. 1b depicts an exemplifying wireless communications system 100 in which embodiments herein may be implemented. In this example, the wireless communications system 100 is an LTE system. In other examples, the wireless communication system may be any 3GPP wireless communication system, such as a Universal Mobile Telecommunication System (UMTS), Wideband Code Division Multiple Access (WCDMA) network, a Global System for Mobile communication (GSM) or the like. The wireless communication system 100 may even be an evolution of any one of the aforementioned systems or a combination thereof. Furthermore, the embodiments are described when the UE is configured to be served by a single carrier, also known as single carrier operation, or configured to use single carrier in a network node. However the embodiments are also applicable for multi-carrier or carrier aggregation operation.

The wireless communication system 100 comprises a network node 120, referred to as a first network node herein. As used herein, the term "network node" may refer to a radio network node, a Base Station (BS), a Base Transceiver Station (BTS), a Radio Base Station (RBS), a Remote Radio Unit (RRU) or a Remote Radio Head (RRH), an access point, a NodeB in so called Third Generation (3G) networks, evolved Node B, eNodeB or eNB in LTE networks, a relay node, a donor node controlling a relay, transmission points or nodes, nodes in a distributed antenna system (DAS), a core network node, or the like. In UMTS Terrestrial Radio Access Network (UTRAN) networks, the term "radio network node" may also refer to a Radio Network Controller. Furthermore, in Global System for Mobile Communications (GSM) EDGE Radio Access Network (GERAN), where EDGE is short for Enhanced Data rates for GSM Evolution, the term "radio network node" may also refer to a Base Station Controller (BSC).

The network node 120 may operate a first cell 101, such as a macro cell, a micro cell, a pico cell, a femto cell.

Furthermore, a wireless device 110 is located in the first cell 101. Expressed differently, the wireless device 110 may be associated with the first cell 101. This means that the wireless device 110 may be connected to, or served by the first cell 101, or the wireless device 110 may camp on the first cell 101.

As used herein, the term "wireless device" may refer to a UE, a subscriber unit, mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, and humidity. As further examples, the sensor may be a light sensor, an electronic switch, a microphone, a loudspeaker, and a camera sensor. Sometimes, the term "user", or "subscriber", may be used to refer to the wireless device.

Furthermore, the wireless communication system 100 comprises a second cell 102. The second cell 102 may be operated by the first network node 120 or by a further network node 130, referred to as a second network node herein. Hence, more generally, the wireless communication system comprises a cell, which may be the first cell 101 or the second cell 102 depending on whether the cell is operated by the network node 120 or the further network node 130. In some example, both the first and second cells 101, 102 are operated by the network node 120. The first network node is typically the serving network node of the wireless device, and the second network node may be a neighbouring network node from which the wireless device can receive signals and/or obtain information.

An exemplifying method in a UE served by the first network node may comprise one or more of the following steps:

Acquiring SI of a cell during a time period, such as a pre-defined time period, e.g. T0, which is applicable for flexible subframe allocation. At least during part of the time period T0, the UE is configured with or is operating with at least one flexible subframe allocation scheme;

Obtaining a minimum number (Nmin) of UL feedback signals (e.g. ACK/NACK), where the Nmin value may be determined based on pre-defined information or on information received from the first network node. The UE should preferably transmit the minimum number Nmin of UL feedback signals in response to at least continuous transmission of DL data on e.g. PDSCH to the UE by the first network node during the time period (e.g. T0). Nmin is associated with the configured flexible subframe allocation;

Transmitting the minimum number (Nmin) of UL feedback signals in response to at least continuous transmission of DL data to the UE by the first network node during the time period (e.g. T0); and Using the acquired SI for one or more radio operations e.g. signaling to the first network node.

An exemplifying method in the first network node serving the UE may comprise one or more of the following steps:

Configuring the UE with at least one flexible subframe allocation scheme (e.g. dynamic or flexible TDD, HD-FDD operations);

Configuring the UE to acquire the SI of at least one cell during a time period, such as a pre-defined time period (e.g. T0), which is applicable for flexible subframe allocation;

Transmitting DL data e.g. on PDSCH to the UE in all the DL subframes during the time period (e.g. T0).

Receiving at least a minimum number (Nmin) of UL feedback signals in response to the continuous transmission of the DL data to the UE during the time period (e.g. T0). Nmin is associated with the configured flexible subframe allocation scheme.

In a dynamic UL/DL subframe allocation (e.g. dynamic TDD system or HD-FDD operation), a group of subframes are fixed subframes, while others are flexible subframes. Fixed subframes are either UL subframes in all radio frames or DL subframes in all radio frames. Flexible subframes can be UL subframes in some radio frames and DL subframes in other radio frames. The assignment of the UL or DL direction is done in a dynamic manner. The serving cell performance can be expressed in terms of number of subframes in which the UE can receive and/or transmit in its serving cell(s). The UE may create autonomous gaps for acquiring SI of a cell. However, when the UE creates autonomous gaps the dynamic UL/DL subframe allocation makes the performance of serving cell performance even more unpredictable. This problem is solved by at least some embodiments herein. Hence, the embodiments herein improve system performance.

Figure 2:
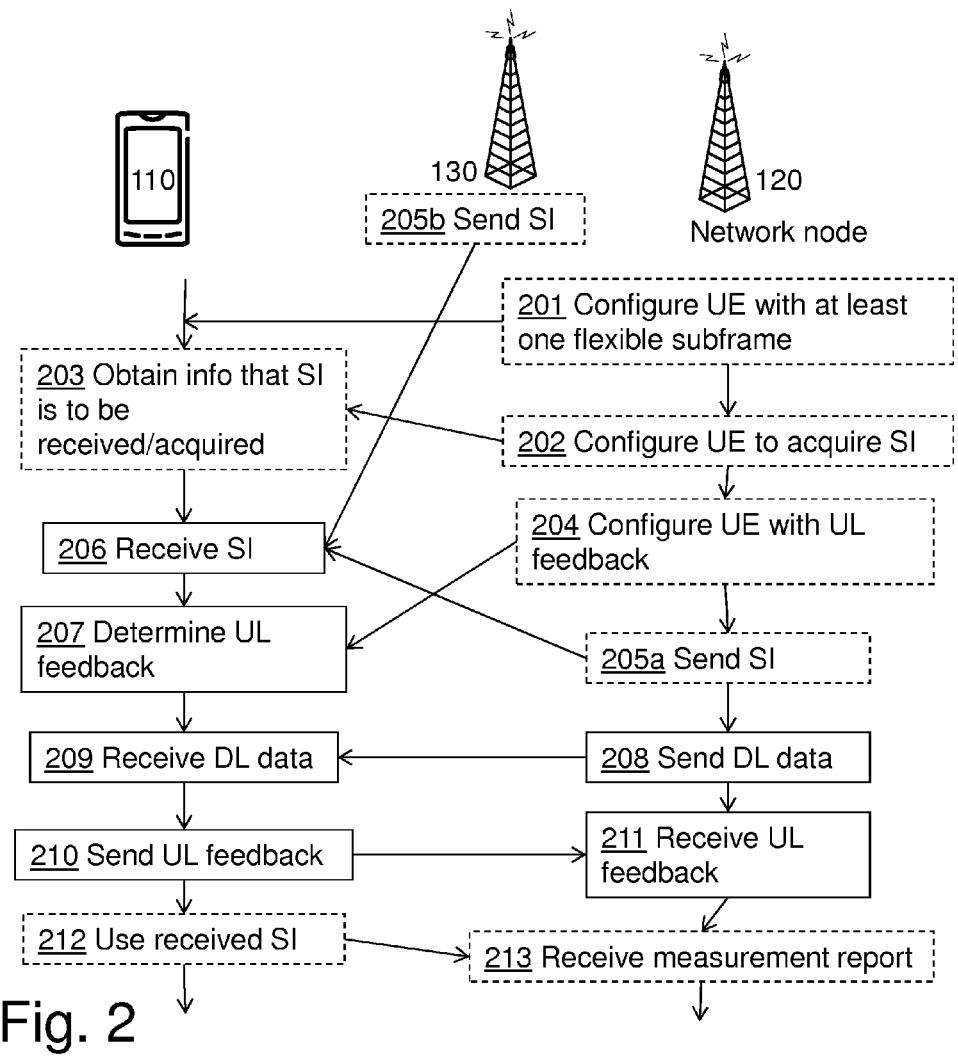
FIG. 2 is a flowchart schematically illustrating an exemplifying method according to embodiments.

FIG. 2 illustrates an exemplifying method according to embodiments herein when performed in connection with the wireless communication system 100 of FIG. 1b.

One or more of the following actions, or steps, may be performed in any suitable order.

Action 201

The first network node 120 may configure the UE with at least one flexible subframe. The at least one flexible subframe may be included in a flexible subframe configuration scheme, which may be applicable during a time period, e.g. during the time period T0 as described in the background section. The time period may be given by DCI as mentioned in the background section. The action 201 may be performed by the configuring module 1020 in FIG. 4b.

Action 202

The first network node 120 may configure, or order/command, the wireless device to acquire SI according to known manners. In response to this action, the wireless device may create autonomous gaps, which may cause the wireless device to miss some of the DL data, or UL data when applicable, sent in action 208. But if UE is scheduled only in DL then it will miss DL data and if UE is scheduled only in UL then it will miss UL data. However, as explained in section "Method in a network node of adapting scheduling during SI acquisition under flexible subframe operation" the missing of the DL data may be avoided. The action 202 may be performed by the configuring module 1020 in FIG. 4b.

Action 203

The wireless device 110 may obtain, e.g. receive, information about that it shall obtain SI, e.g. for the second cell and/or for the first cell. The action 203 may be performed by the obtaining module 820 in FIG. 3b.

Action 204

The first network node 120 may further configure the wireless device with information about minimum UL feedback. The information about minimum UL feedback may specify in which subframes the wireless device shall send UL feedback, e.g. HARQ feedback such as ACK/NACK. The information about minimum UL feedback may be a minimum number of UL feedback signals and/or subframes corresponding thereto. Moreover, the information about minimum UL feedback may be associated with the flexible subframe configuration scheme, e.g. UL/DL configuration. This action may be performed by the configuring module 1020 in FIG. 4b.

In this manner, the wireless device and the first network node may obtain common understanding of HARQ timing, i.e. when UL feedback is sent from the wireless device.

Action 205a and/or 205b

The first network node 120 sends SI to the wireless device and/or the second network node 130 sends SI to the wireless device.

Action 206

The wireless device 110 receives SI from the first network node. Alternatively, the wireless device 110 may receive SI from the second network node 130 (alternative not shown in FIG. 2).

Action 207

The wireless device 110 obtains the minimum (min) UL feedback. The minimum UL feedback may be associated with the applied, or configured, at least one flexible subframe as in action 201. Thus, the minimum UL feedback may be associated with the flexible subframe configuration scheme, such as UL/DL configuration.

In some examples, the min UL feedback may be configured by the first network node as in action 204. The min UL feedback may e.g. be sent from the first network node.

In some examples, the min UL feedback may be determined by the wireless device according to various manners as described in bullet 4, in section "Method in a UE of adapting serving cell performance during SI acquisition under flexible subframe operation". This action 207 may be performed by the determining module 840 in FIG. 3b.

The first network node may be aware of how the wireless device performs action 207. In this way, the first network node and the wireless device obtain a common understanding of when and/or how UL feedback is to be sent from the wireless device.

Action 208

The first network node 120 sends DL data to the wireless device.

Action 209

The wireless device 110 receives the DL data from the first network node 120 (see action 208).

Action 210

In response to the reception of the DL data, the wireless device 110 sends UL feedback.

Action 211

The first network node 120 receives the UL feedback from the wireless device (see action 210).

Action 212

The wireless device 110 may use the received SI in various manner, e.g. in order to measure on the second cell as a preparation before a handover.

Action 213

The network node 120 may receive e.g. a measurement report, where the measurement report is based on the measurements of the wireless device in action 212.

Method in a UE of Adapting Serving Cell Performance During SI Acquisition Under Flexible Subframe Operation This embodiment describes a method implemented in a UE operating in a first cell which is served, or operated, by a first network node, wherein the UE acquires the SI of at least one second cell which is served, or operated, by the second network node and wherein the UE is also configured to operate with flexible subframe allocation scheme, e.g. dynamic or flexible TDD or HD-FDD operations. The flexible subframe allocation scheme is used in at least one first cell from which the UE receives and/or transmits data. The first cell is the serving cell or at least one of the serving cells of the UE configured with a plurality of serving cells for multi-carrier operation. The serving cell may also be interchangeably called a PCell (primary cell). An SCell (secondary cell) is also a serving cell in multi-carrier operation. The flexible subframe allocation scheme may also be used in other cells e.g. one or more neighbouring cells on intra-frequency and/or non-serving carrier frequencies. The first and second cells may operate on the same carrier frequency (intra-frequency cells), on different carrier frequencies of the same RAT (inter-frequency cells), on the same frequency of different RATs, or on different carrier frequencies of different RATs. As a special case the first and the second cells can be the same, e.g. when the UE acquires the SI of the serving cell. The steps performed in the UE may comprise one or more of:

1. Obtaining information that SI of at least one second cell is to be acquired. The SI may comprise one or more of MIB, SIB1 or any other SIB (e.g. SIB2, SIB3). The information can be obtained based on a request received from the first network node or it can be decided internally by the UE. An example of a received request can be an RRC message containing one or more of 'reportCGI' or 'report CSG indicator' or 'reporting SI', where a CSG is a Closed Subscriber Group. The term 'acquisition of SI or acquiring SI' may also be called 'SI reading or reading of SI', 'identifying or identification of SI', 'determining SI' etc. This action is similar to action 203.

2. Creating autonomous gaps for acquiring the SI of the at least one second cell based on the obtained information. The autonomous gaps are created for use during a pre-defined duration (e.g. T0, or another time period). The pre-defined duration or time period may also be referred to as a time needed to identify CGI of a cell, or a time needed to acquire SI of a cell. During autonomous gaps the UE serving operation is interrupted. This implies that during such gaps the UE in the serving cell (i.e. in the first cell) may not transmit any signal in UL and may not receive any signal in DL. This means that the UE cannot be served in UL and DL by its serving cell during such gaps. This action may be performed in response to action 202. Therefore, this action may be part of action 203 above.

3. Determining that the UE is configured to operate with a flexible subframe allocation scheme in at least one serving cell during at least part of T0. This action may be part of action 207 above. The determination of the scheme can be based on configuration received from the first network node and/or based on a UE radio access capability associated with the flexible subframe allocation scheme supported by the UE. The flexible subframe allocation scheme may comprise one of:

a. Flexible or dynamic TDD configuration, which apply at least partly during the time period (e.g. T0). The flexible TDD configuration may involve one or more of the following:

i. At least one subframe changes between any two of UL subframe, DL subframe and special subframe;

ii. A number of subframes and/or allocation in time of at least one subframe is different during two different radio frames;

iii. At least two different TDD UL/DL configurations are configured or indicated by the first network node for use by the UE;

iv. At least two different TDD UL/DL configurations are used by the UE.

b. Flexible subframe operation in HD-FDD, which apply at least partly during the time period (e.g. T0). The flexible subframe operation in HD-FDD may involve one or more of the following:

i. At least one subframe changes between any two of UL subframe, DL subframe and unused subframe;

ii. A number of subframes and/or allocation in time of at least one subframe is different during two different radio frames;

iii. At least two different subframe configurations, also known as HD-FDD configurations or HD-FDD subframe configurations, are configured or indicated by the first network node for use by the UE;

iv. At least two different subframe configurations are used by the UE.

4. Obtaining (or determining) a minimum number (Nmin) of UL feedback signals that the UE preferably should transmit in response to at least continuous transmission of DL data (e.g. PDSCH) to the UE by the first network node during the time period (e.g. T0). The minimum number Nmin is associated with the determined flexible subframe allocation scheme. The continuous transmission of DL data herein means that the first network node transmits data in all the DL subframes during the SI acquisition time, that is e.g. over T0. The minimum number Nmin may be applicable under or associated with additional conditions or constraints. These additional conditions or constraints may comprise one or more of that during at least part of T0 when the UE is NOT configured with a measurement gap, the UE is NOT configured with any DRX cycle, the UE is not operating in DRX, the UE is configured to receive DL data from the first network node with a pre-defined number of code words in one subframe (e.g. 1 code word per subframe), and no Multicast Broadcast Single Frequency Network (MBSFN) subframe is configured in the serving cell or PCell. Examples of subframes which can be configured as MBSFN subframes are subframes #1, 2, 3, 6, 7 and 8 for FDD and subframes #3, 4, 7, 8 and 9 for TDD. This action is similar to action 207 above.
a. Example of pre-defined number of code words is 1 code word. Examples of UL feedback signals are:
  i. Any UL signal which is sent by the UE as part of HARQ feedback for acknowledging the reception of DL channels e.g. reception of PDSCH from the first network node.
  ii. More specifically the number of ACK/NACK transmitted by the UE as part of HARQ feedback. For example one ACK or NACK corresponds to DL transmission with single or one code word. For example in 10 subframes with DL transmission with one code word per frame the Nmin is also ten ACK/NACK.
b. The minimum number Nmin can be obtained by any one or more of the following means:
c. Information (i.e. the minimum number value Nmin) received from the first network node;
d. Pre-defined minimum number, Nmin, specified in the standard. In this case the Nmin is stored in the memory of the UE;
e. Pre-defined rule, expression or function used to derive Nmin. Examples of such rules and functions are that when flexible subframe allocation is used at least partly during the time period (e.g. T0) then:
  i. The UE shall assume that Nmin is equal to the number of ACK/NACK used for certain reference or pre-defined subframe configuration, wherein a subframe configuration comprises of any combination of DL, UL, unused, special subframes per frame. For example, Nmin may be the number of ACK/NACK when using any of HD-FDD configuration assuming only two DL subframes per frame, TDD configuration with certain number of DL subframe per frame (e.g. two DL per frame), or TDD configuration #0 (i.e. 18 ACK/NACK).
  ii. The UE shall assume that Nmin is equal to the lowest number of ACK/NACK out of ACK/NACKs corresponding to all possible (i.e. pre-defined) subframe configurations, e.g. out of TDD configurations #0 to #6.
  iii. The UE shall assume that Nmin is equal to the lowest number of ACK/NACK out of ACK/NACKs corresponding to all pre-configured subframe configurations e.g. out of TDD configurations #0, #1 and #4.
  iv. The UE shall derive the minimum number value Nmin based on a function of plurality of number of ACK/NACK corresponding to at least two subframe configurations. Examples of functions are minimum, maximum, mean, and the Xth percentile. It may for example be assumed that the number of ACK/NACK corresponding to TDD configurations #1 and #6 are 35 and 30 respectively. By applying the minimum function, the UE shall derive Nmin=30 ACK/NACK, which it has to transmit during the time period (e.g. T0) under continuous DL data allocation/transmission by the first network node.
  v. The UE shall derive the minimum number value Nmin based on a function of a plurality of number of ACK/NACK corresponding to all the pre-defined subframe configurations.
  vi. The UE shall derive the minimum number Nmin based on a function of a plurality of number of ACK/NACK corresponding to at least the subframe configurations configured by the first network node for use by the UE during T0.
  vii. The UE shall derive the minimum number, Nmin, based on a function of a plurality of number of ACK/NACK corresponding to at least the subframe configurations used by the UE during T0.
  viii. The UE shall derive the minimum number Nmin as a function of: the minimum number Nmin_ref specified for the scenario without flexible subframe configuration and a degradation with respect to Nmin_ref. Examples of the degradation are:
    Nmin=Nmin_ref-N, where N is the number of ACK/NACK that may be lost due to using flexible subframe configuration; in another example, N may also depend on the exact subframe configurations that are flexible such as the number of DL or UL subframes;
    Nmin=Nmin_ref*r0 or Nmin=Nmin_ref*(1−r1) or Nmin=Nmin_ref*(100%−r2)/100%, where r1 (e.g., 0.1) and r2 (e.g., 2%) are relative degradations, and r0 (0<r0<1) is a parameter reflecting a degradation.
5. Acquiring the SI of the at least one second cell using autonomous gap during the time period (e.g. T0) based at least on the obtained information in step 1. This action is similar to action 206.
6. Transmitting the minimum number Nmin of UL feedback signals in response to or corresponding to the continuous transmission of DL data by the first network node to the UE during the time period (e.g. during T0). This action is similar to action 210.
7. Using the acquired SI information for one or more radio operations. This action is similar to action 212. Examples of radio operations are:
  a. Signaling the acquired SI to the first network node or to another UE;
  b. Signaling the acquired SI to another UE if both UEs are capable of Device-to-Device (D2D) operation or communication;
  c. Storing the acquired SI in the memory for use at future time. In one example the stored data is reported to the network node as part of the minimization of drive test (MDT) or self-organizing network (SON);
  d. Comparing the acquired CGI in the SI with the PCI of the second cell for verifying or confirming the identification of the second cell.

It should be noted that the steps 1-7 explained above are not necessarily done in the order that is presented here. For example it can be that step 3, which is the determining that the UE is configured to operate with a flexible subframe allocation scheme, is done before steps 1 and 2.

Method in a Network Node of Assisting the UE to Adapt Serving Cell Performance During SI Acquisition Under Flexible Subframe Operation This embodiment describes a method implemented in a first network node operating a first cell and serving a UE. The UE acquires the SI of at least one second cell which is served by the second network node. The first network node configures the UE to operate with flexible subframe allocation scheme e.g. dynamic or flexible TDD, or HD-FDD operations. The flexible subframe allocation scheme is used in at least one first cell from which the UE receives and/or transmits data. The first cell is the serving cell or at least one of the serving cells of the UE configured with plurality of serving cells for multi-carrier operation. The serving cell may interchangeably be referred to as a PCell. SCell is also a serving cell in multi-carrier operation. The flexible subframe allocation scheme may also be used in other cells, e.g. in one or more neighbouring cells on intra-frequency and/or non-serving carrier frequencies. The first and second cells may operate on the same carrier frequency (intra-frequency cells), on different carrier frequencies of the same RAT (inter-frequency cells), on the same frequency of different RATs, or on different carrier frequencies of different RATs. As a special case the first and the second cells can be the same, e.g. when the UE acquires the SI of the serving cell. The steps performed in the first network node comprise one or more of the following:

1. Configuring the UE to operate with at least one flexible subframe allocation scheme in at least one serving cell. The scheme may e.g. comprise dynamic or flexible TDD, or HD-FDD operations, as described in Step 3 of the section "Method in a UE of adapting serving cell performance during SI acquisition under flexible subframe operation". This action is similar to action 201.
2. Requesting or configuring the UE to report CGI or acquire SI of at least one second cell. This action is similar to action 202.
3. Configuring (optionally) the UE with the minimum number (Nmin) of UL feedback signals that the UE preferably should transmit in response to at least continuous transmission of DL data (e.g. PDSCH) to the UE by the first network node during the time period (e.g. T0). The minimum number Nmin is associated with the determined flexible subframe allocation scheme. Prior to configuring the UE with Nmin, the first network node may also determine the Nmin. In one example the first network node may also configure the UE with the Nmin corresponding to the amount of data that the first network node has to transmit to the UE during the time period, e.g. T0. This can be determined by observing the amount of data for the UE in the buffer. In another example the Nmin can be determined based on one or more of a pre-defined rule, an expression, or a function, as described in Step 4 of section "Method in a UE of adapting serving cell performance during SI acquisition under flexible subframe operation". This action is similar to action 204.
4. Transmitting continuously DL data (e.g. PDSCH) to the UE during the time T0. The continuous DL data transmission comprises transmitting DL data channel in all DL subframes during the time period (e.g. T0). This action is similar to action 208.
5. Receiving at least the minimum number Nmin of UL feedback signals transmitted by the UE in response to at least said continuous transmission of DL data to the UE. The minimum number Nmin of UL signals is equal to one of: the configured minimum number of UL signals; a pre-defined minimum number specified in the standard; and a pre-defined rule, expression or function as described in Step 4 of section "Method in a UE of adapting serving cell performance during SI acquisition under flexible subframe operation". This action is similar to action 211.
6. Receiving the measurement report from the UE containing at least the acquired SI during the time period (e.g. T0). This action is similar to action 213.

It should be noted that the steps explained above are not necessarily done in the order that is presented here.

Method in a Network Node of Adapting Scheduling During SI Acquisition Under Flexible Subframe Operation This embodiment describes yet another method implemented in a first network node for the same scenario mentioned in section "Method in a network node of assisting UE to adapt serving cell performance during SI acquisition under flexible subframe operation". In this method, the network node adapts its scheduling of data to the UE during at least T0, when the network node configures the UE or plan to configure the UE to acquire the SI of at least the second cell, while taking into account the following:

A minimum number (Nmin) of UL feedback signals that the UE preferably should transmit in response to at least continuous transmission of DL data (e.g. PDSCH) to the UE by the first network node during the time period (e.g. T0). The minimum number Nmin is associated with the determined flexible subframe allocation scheme.

That the UE is configured with at least one flexible subframe allocation scheme and/or is operating with at least one flexible subframe allocation scheme during at least part of T0.

Examples of adaptation of scheduling are:

Scheduling the UE for receiving data in number of subframes corresponding or not exceeding to the minimum number (Nmin) of UL feedback signals transmitted by the UE during the time period (e.g. T0). The Nmin may be determined as described in Step 4 of section "Method in a UE of adapting serving cell performance during SI acquisition under flexible subframe operation" and in Steps 3 and 4 of section "Method in a network node of assisting UE to adapt serving cell performance during SI acquisition under flexible subframe operation".

Modifying one or more parameters of the flexible subframe allocation scheme in order to increase the available subframes, if the determined number of subframes in which the first network node can schedule the UE during the time period (e.g. T0) is below a threshold (e.g. less than 15 subframes). One example is to use or configure the UE during the time period (e.g. T0) with only those subframe configurations which have at least three or more DL subframes per radio frame.

In one example embodiment, the network node schedules the wireless device while taking the minimum number of UL feedback signals into account. After adapting the scheduling scheme the first network node may start scheduling the UE with DL data using the adapted scheduling scheme.

Embodiments of Methods Described with Reference to FIGS. 5*a* and 5*b*

Figure 5A:
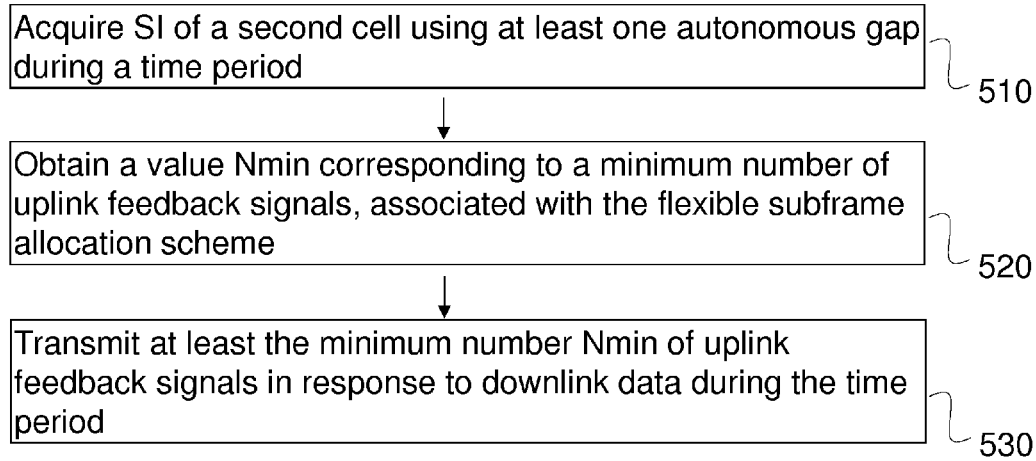
FIGS. 5a-b are flowcharts illustrating the method in the wireless device according to some embodiments of the present invention.

FIG. 5*a* is a flowchart illustrating one embodiment of the method performed in the wireless device 110 located in the first cell 101 operated by the network node 120 of the wireless communication system 100. In one embodiment the wireless device 110 may be a UE located in a cell 101 of a E-UTRAN served by an eNodeB. The network node 120 may thus be the eNodeB. The first cell 101 may be a serving cell, a PCell in multi-carrier operation, or a SCell in multi-carrier operation. The method comprises:

510: Acquiring SI of a second cell using at least one autonomous gap during a time period. The SI may comprise information uniquely identifying the second cell. The time period has been referred to as T0 previously. One example of the time period is the time period specified in 3GPP TS 36.331 $T_{identify\_CGI,\ intra}$ ms. The wireless device is configured with a flexible subframe allocation scheme in the first cell during at least a part of the time period. The wireless device may be configured with the flexible subframe allocation scheme based on configuration information received from the network node. The flexible subframe allocation scheme may e.g. be a dynamic TDD or a HD-FDD subframe allocation scheme. This step may correspond to action 206 described above.

520: Obtaining a value Nmin corresponding to a minimum number of uplink feedback signals. In one embodiment Nmin may be 18, as described previously. The uplink feedback signals may comprise acknowledgement and non-acknowledgement signals (ACK/NACK) as part of HARQ feedback. The value Nmin is associated with the flexible subframe allocation scheme. Obtaining the value Nmin may comprise receiving information from the network node comprising the value Nmin (see step 625 below). Alternatively, obtaining may comprise retrieving the value Nmin stored in the wireless device, or deriving the value Nmin based on a pre-defined rile, and expression, or a function, as described above in bullet 4.e in the section "Method in a UE of adapting serving cell performance during SI acquisition under flexible subframe operation".

530: Transmitting at least the minimum number Nmin of uplink feedback signals in response to downlink data during the time period. The uplink feedback signals may be transmitted in the first cell in response to downlink data received from the network node in the first cell. As described above, in case of dynamic TDD, and for TDD-TDD and TDD-FDD inter-frequency measurements with autonomous gap, the UE shall be able to transmit at least 18 ACK/NACKs during $T_{identify\_CGI, intra}$ ms. This step may correspond to action 209 and 210 described above.

Figure 5B:
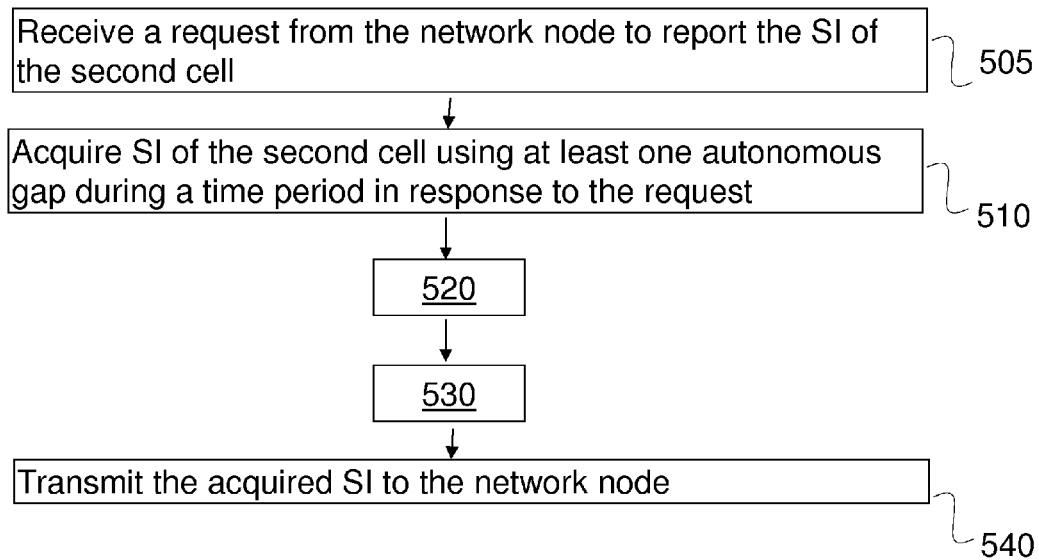

FIG. 5b is a flowchart illustrating another embodiment of the method in the wireless device 110. The method comprises:

505: Receiving a request from the network node to report the SI of the second cell. The SI may comprise information uniquely identifying the second cell. This step may correspond to action 203 described above.

510: Acquiring SI of a second cell in response to the request using at least one autonomous gap during a time period. The wireless device is configured with a flexible subframe allocation scheme in the first cell during at least a part of the time period. The flexible subframe allocation scheme may e.g. be a dynamic or flexible TDD subframe allocation scheme.

520: Obtaining a value Nmin corresponding to a minimum number of UL feedback signals. The value Nmin is associated with the flexible subframe allocation scheme.

530: Transmitting at least the minimum number Nmin of UL feedback signals in response to downlink data during the time period. As described above, in case of dynamic TDD, and for TDD-TDD and TDD-FDD inter-frequency measurements with autonomous gap, the UE shall be able to transmit at least 18 ACK/NACKs during $T_{identify\_CGI, intra}$ ms.

540: Transmitting the acquired SI to the network node. This step may correspond to action 212 described above.

Figure 6A:
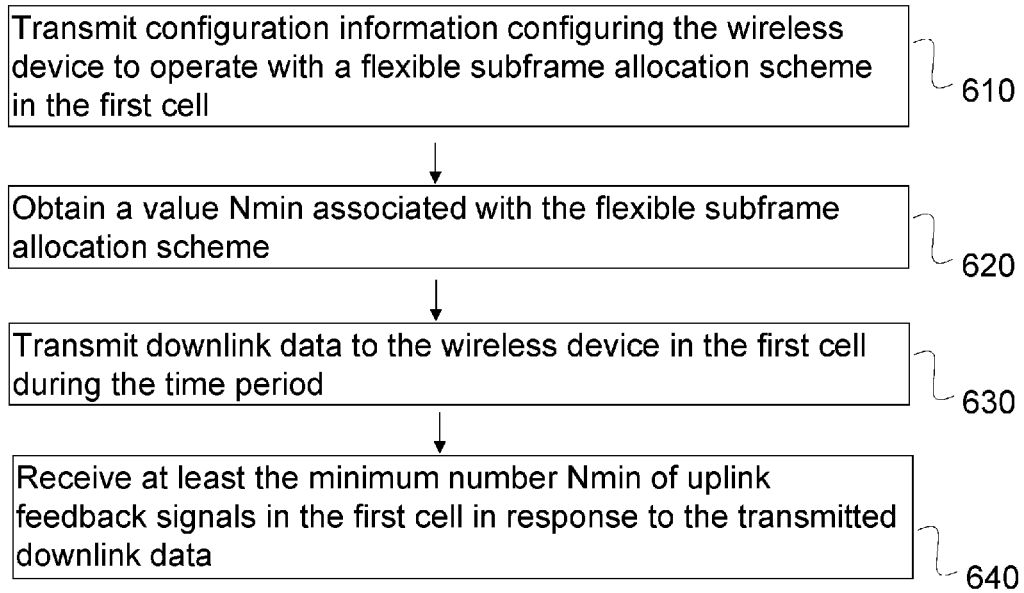
FIGS. 6a-b are flowcharts illustrating the method in the network node according to some embodiments of the present invention.

FIG. 6a is a flowchart illustrating one embodiment of the method performed in the network node 120 of the wireless communication system 100 operating the first cell 101. The wireless device 110 is served by the first cell 101. The first cell 101 may be a serving cell, a PCell in multi-carrier operation, or a SCell in multi-carrier operation. The method comprises:

610: Transmitting configuration information to the wireless device, configuring the wireless device to operate with a flexible subframe allocation scheme in the first cell during at least part of a time period during which the wireless device acquires SI of a second cell. The SI may comprise information uniquely identifying the second cell. The flexible subframe allocation scheme may be a dynamic Time Division Duplex, TDD, or a Half Duplex Frequency Division Duplex, HD-FDD subframe allocation scheme. This step may correspond to action 201 described above.

620: Obtaining a value Nmin associated with the flexible subframe allocation schem. The value Nmin corresponds to a minimum number of UL feedback signals that the wireless device shall transmit in response to downlink data during the time period. The UL feedback signals may comprise acknowledgement and non-acknowledgement signals (ACK/NACK) as part of HARQ feedback. Obtaining the value Nmin may as described for the wireless device above, be done in alternative ways. Obtaining may comprise retrieving the value Nmin stored in the network node, determining the value Nmin based on a pre-defined rule, expression or function (as described above), or determining the value Nmin based on an amount of data associated with the wireless device in the buffer of the network node.

630: Transmitting downlink data to the wireless device in the first cell during the time period. This step may correspond to action 208 described above.

640: Receiving at least the minimum number Nmin of UL feedback signals in the first cell in response to the transmitted downlink data. This step may correspond to action 211 described above.

Figure 6B:
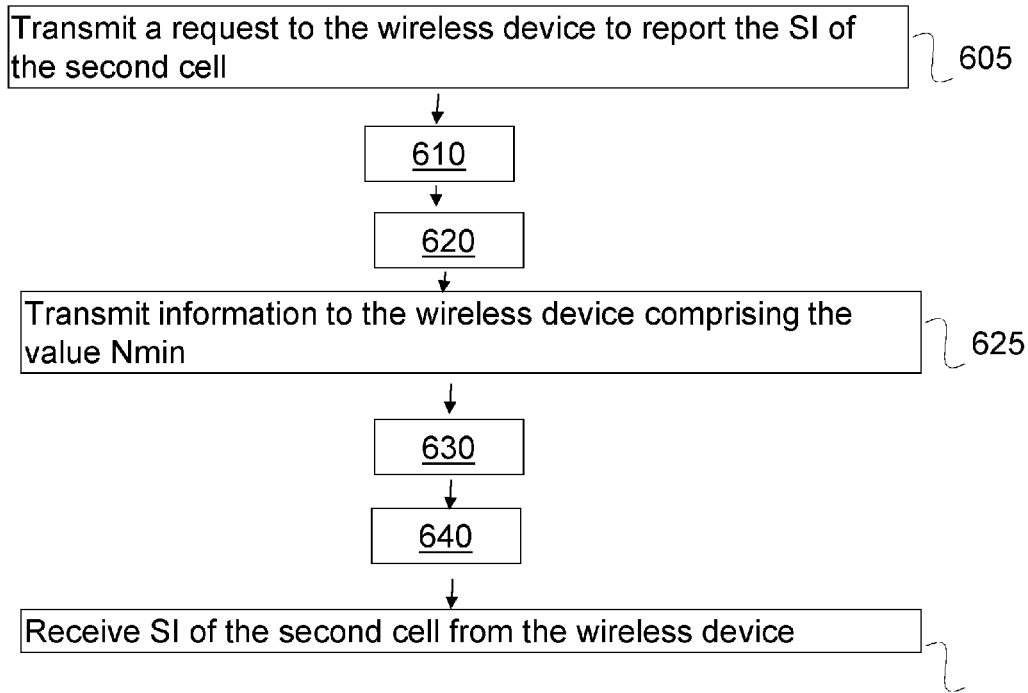

FIG. 6b is a flowchart illustrating another embodiment of the method in the network node 120. The method comprises:

605: Transmitting a request to the wireless device to report the SI of the second cell. The SI may comprise information uniquely identifying the second cell. This step may correspond to action 202 described above.

610: Transmitting configuration information to the wireless device, configuring the wireless device to operate with a flexible subframe allocation scheme in the first cell during at least part of a time period during which the wireless device acquires SI of a second cell.

620: Obtaining a value Nmin associated with the flexible subframe allocation scheme, the value Nmin corresponding to a minimum number of UL feedback signals that the wireless device shall transmit in response to downlink data during the time period.

625: Transmitting information to the wireless device comprising the value Nmin

630: Transmitting downlink data to the wireless device in the first cell during the time period.

640: Receiving at least the minimum number Nmin of UL feedback signals in the first cell in response to the transmitted downlink data.

650: Receiving SI of the second cell from the wireless device.

As described in the section "Method in a network node of adapting scheduling during SI acquisition under flexible subframe operation", the method may in any of the above described embodiments further comprise adapting a scheduling scheme for the wireless device based on the minimum number of UL feedback signals that the wireless device shall transmit in response to downlink data during the time period, and scheduling the wireless device using the adapted scheduling scheme. In another embodiment, the method may comprise adapting one or more parameters of the flexible subframe allocation scheme based on the minimum number of subframes in which the wireless device can be scheduled with downlink data during the time period. The configuration information transmitted in 610 to the wireless device may then configure the wireless device to operate with the adapted flexible subframe allocation scheme.

Embodiments of Apparatus Described with Reference to FIGS. 7a-b

Figure 7A:
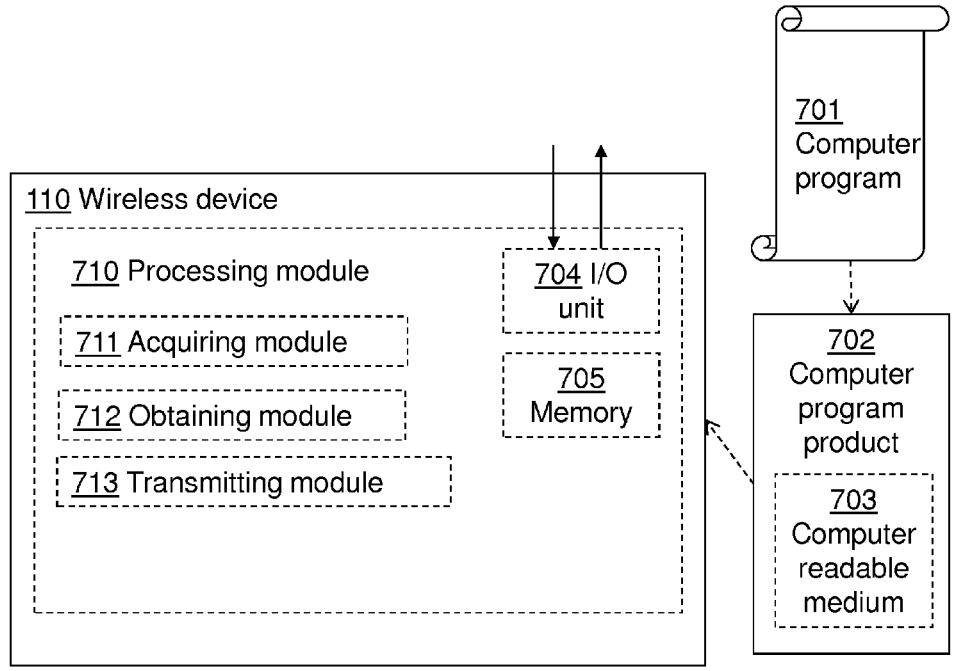
FIGS. 7a-b are block diagrams schematically illustrating the wireless device and the network node respectively according to some embodiments of the present invention.

An embodiment of the wireless device 110 is schematically illustrated in the block diagram in FIG. 7a. The wireless device 110 is configured to, when located in the first cell 101 operated by the network node 120 of the wireless communication system 100, acquire SI of a second cell using at least one autonomous gap during a time period. The first cell may be a serving cell, a PCell in multi-carrier operation, or a SCell in multi-carrier operation. The wireless device is configured with a flexible subframe allocation scheme in the first cell during at least a part of the time period. The flexible subframe allocation scheme may be a dynamic TDD or a HD-FDD subframe allocation scheme. The wireless device is further configured to obtain a value Nmin corresponding to a minimum number of UL feedback signals. The value Nmin is associated with the flexible subframe allocation scheme. The UL feedback signals may comprise acknowledgement and non-acknowledgement signals (ACK/NACK) as part of HARQ feedback. The wireless device is also configured to transmit at least the minimum number Nmin of UL feedback signals in response to downlink data during the time period.

In embodiments, the wireless device 110 may be further configured to receive a request from the network node to report the SI of the second cell, and to acquire the SI in response to the request. The wireless device may be configured to acquire the SI comprising information uniquely identifying the second cell. The wireless device 110 may also be further configured to transmit the acquired SI to the network node.

The wireless device may further be configured to transmit the UL feedback signals in the first cell in response to downlink data received from the network node in the first cell.

The wireless device may also be configured to obtain the value Nmin by one of the following: receiving information from the network node comprising the value Nmin; retrieving the value Nmin stored in the wireless device; deriving the value Nmin based on a pre-defined rule, expression or function.

In embodiments, the wireless device 110 is configured with the flexible subframe allocation scheme based on configuration information received from the network node.

In embodiments of the invention, the wireless device 110 may comprise a processing module 710 and a memory 705 as illustrated in FIG. 7a. The wireless device 110 may also comprise an input/output (I/O) unit 704 configured to communicate with the network node 120 or another node of the communication system. The memory 705 may contain instructions executable by said processing module 710 whereby the wireless device 110 is operative to acquire SI of a second cell using at least one autonomous gap during a time period. The wireless device is configured with a flexible subframe allocation scheme in the first cell during at least a part of the time period. The wireless device 110 may be further operative to obtain a value Nmin corresponding to a minimum number of UL feedback signals. The value Nmin is associated with the flexible subframe allocation scheme. The wireless device 110 may also be operative to transmit at least the minimum number Nmin of UL feedback signals in response to downlink data during the time period.

In an alternative way to describe the embodiment in FIG. 7a, the wireless device 110 may comprise an acquiring module 711 adapted to acquire SI of a second cell using at least one autonomous gap during a time period. The wireless device is configured with a flexible subframe allocation scheme in the first cell during at least a part of the time period. The wireless device may be configured with the flexible subframe allocation scheme based on configuration information received from the network node. The flexible subframe allocation scheme may be a dynamic TDD or a HD-FDD subframe allocation scheme. The first cell may be one of the following: a serving cell, a PCell in multi-carrier operation, or a SCell in multi-carrier operation. The wireless device 110 may also comprise an obtaining module 712 adapted to obtain a value Nmin corresponding to a minimum number of UL feedback signals. The value Nmin is associated with the flexible subframe allocation scheme. The uplink feedback signals may comprise acknowledgement and non-acknowledgement signals as part of hybrid automatic retransmission request feedback. The wireless device 110 may further comprise a transmitting module 713 adapted to transmit at least the minimum number Nmin of UL feedback signals in response to downlink data during the time period.

Furthermore, the wireless device 110 may comprise a receiving module adapted to receive a request from the network node to report the system information of the second cell, wherein the acquiring module 711 is adapted to acquire the system information in response to the request. The transmitting module 713 may also be adapted to transmit the acquired system information to the network node. The system information may comprise information uniquely identifying the second cell. The transmitting module 713 may further be adapted to transmit the uplink feedback signals in the first cell in response to downlink data received from the network node in the first cell.

The obtaining module 712 may be adapted to obtain the value Nmin by one of the following: receiving information from the network node comprising the value Nmin; retrieving the value Nmin stored in the wireless device; or deriving the value Nmin based on a pre-defined rule, expression or function.

The modules described above are functional units which may be implemented in hardware, software, firmware or any combination thereof. In one embodiment, the modules are implemented as a computer program running on a processor.

In still another alternative way to describe the embodiment in FIG. 7a, the wireless device 110 may comprise a Central Processing Unit (CPU) which may be a single unit or a plurality of units. Furthermore, the wireless device 110 may comprise at least one computer program product (CPP) 702 with a computer readable medium 703 in the form of a non-volatile memory, e.g. an EEPROM (Electrically Erasable Programmable Read-Only Memory), a flash memory or a disk drive. The CPP 702 may comprise a computer program 701 stored on the computer readable medium 703, which comprises code means which when run on the CPU of the wireless device 110 causes the wireless device 110 to perform the methods described earlier in conjunction with FIGS. 5a-b. In other words, when said code means are run on the CPU, they correspond to the processing module 710 in FIG. 7a.

Figure 7B:
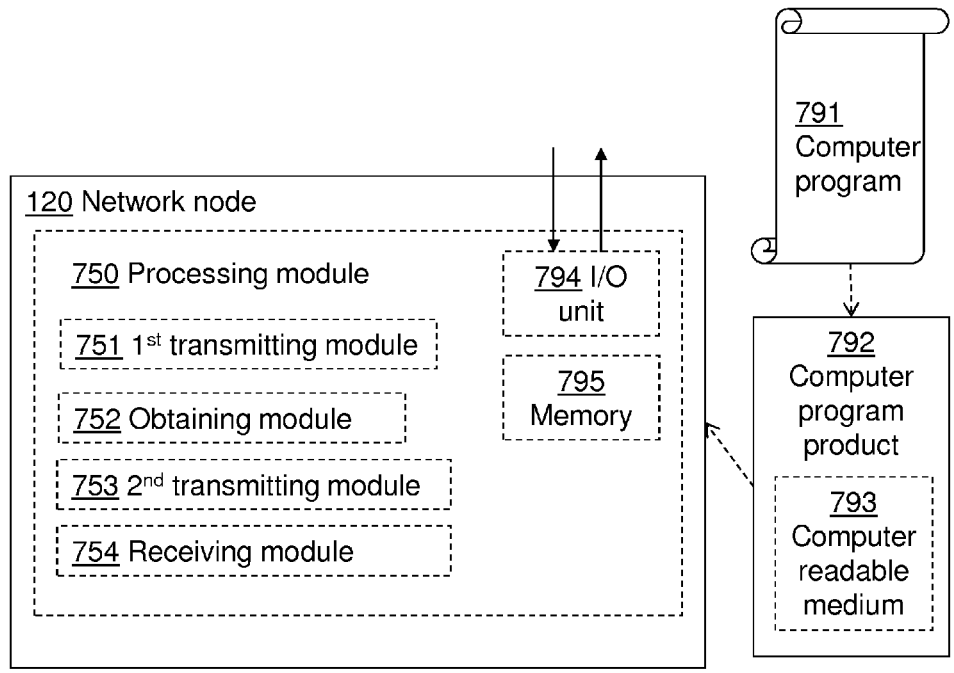

An embodiment of the network node 120 is schematically illustrated in the block diagram in FIG. 7b. The network node 120 is configured to, operate the first cell 101. The wireless device 110 is served by the first cell 101. The first cell may be a PCell in multi-carrier operation, or a SCell in multi-carrier operation. The network node 120 is further configured to transmit configuration information to the wireless device, configuring the wireless device to operate with a flexible subframe allocation scheme in the first cell during at least part of a time period during which the wireless device acquires SI of a second cell. The network node 120 is also configured to obtain a value Nmin associated with the flexible subframe allocation scheme. The value Nmin corresponds to a minimum number of UL feedback signals that the wireless device shall transmit in response to downlink data during the time period. The network node 120 is further configured to transmit downlink data to the wireless device in the first cell during the time period, and receive at least the minimum number Nmin of UL feedback signals in the first cell in response to the transmitted downlink data.

The network node 120 may be further configured to transmit a request to the wireless device to report the SI of the second cell. The network node 120 may also be configured to receive SI of the second cell from the wireless device. The SI may comprise information uniquely identifying the second cell. The network node 120 may be configured to obtain the value Nmin by retrieving the value Nmin stored in the network node, by determining the value Nmin based on a pre-defined rule, expression, or function, or by determining the value Nmin based on an amount of data associated with the wireless device in the buffer of the network node. The network node 120 may be further configured to transmit information to the wireless device comprising the value Nmin.

In embodiments, the network node 120 may be further configured to adapt a scheduling scheme for the wireless device based on the minimum number of UL feedback signals that the wireless device shall transmit in response to downlink data during the time period, and schedule the wireless device using the adapted scheduling scheme. The network node 120 may also be configured to adapt one or more parameters of the flexible subframe allocation scheme based on the minimum number of subframes in which the wireless device can be scheduled with downlink data during the time period, and transmit configuration information to the wireless device, configuring the wireless device to operate with the adapted flexible subframe allocation scheme.

In embodiments of the invention, the network node 120 may comprise a processing module 750 and a memory 795 as illustrated in FIG. 7b. The network node 120 may also comprise an input/output (I/O) unit 794 configured to communicate with the wireless device or another node of the communication system. The memory 795 may contain instructions executable by said processing module 750 whereby the network node 120 is operative to transmit configuration information to the wireless device, configuring the wireless device to operate with a flexible subframe allocation scheme in the first cell during at least part of a time period during which the wireless device acquires system information of a second cell. The network node 120 may be further operative to obtain a value Nmin associated with the flexible subframe allocation scheme. The value Nmin corresponds to a minimum number of uplink feedback signals that the wireless device shall transmit in response to downlink data during the time period. The network node 120 may also be operative to transmit downlink data to the wireless device in the first cell during the time period. The network node 120 may further be operative to receive at least the minimum number Nmin of uplink feedback signals in the first cell in response to the transmitted downlink data.

In an alternative way to describe the embodiment in FIG. 7b, the network node 120 may comprise a first transmitting module 751 adapted to transmit configuration information to the wireless device, configuring the wireless device to operate with a flexible subframe allocation scheme in the first cell during at least part of a time period during which the wireless device acquires system information of a second cell. The flexible subframe allocation scheme may be a dynamic TDD or a HD-FDD subframe allocation scheme. The first cell may be one of the following: a serving cell, a PCell in multi-carrier operation, or a SCell in multi-carrier operation. The network node 120 may also comprise an obtaining module 752 adapted to obtain a value Nmin associated with the flexible subframe allocation scheme. The value Nmin corresponds to a minimum number of uplink feedback signals that the wireless device shall transmit in response to downlink data during the time period. The uplink feedback signals may comprise acknowledgement and non-acknowledgement signals as part of hybrid automatic retransmission request feedback. The obtaining module 752 may be adapted to obtain the value Nmin by one of the following: retrieving the value Nmin stored in the network node; determining the value Nmin based on a pre-defined rule, expression or function; or determining the value Nmin based on an amount of data associated with the wireless device in the buffer of the network node. The network node 120 may further comprise a second transmitting module 753 adapted to transmit downlink data to the wireless device in the first cell during the time period. The network node 120 may further comprise a receiving module 754 adapted to receive at least the minimum number Nmin of uplink feedback signals in the first cell in response to the transmitted downlink data. The modules described above are functional units which may be implemented in hardware, software, firmware or any combination thereof. In one embodiment, the modules are implemented as a computer program running on a processor.

The transmitting modules 751 and 753 of the network node 120 may be further adapted to transmit a request to the wireless device to report the system information of the second cell. The receiving module 754 may be further adapted to receive system information of the second cell from the wireless device. The system information may comprise information uniquely identifying the second cell. The transmitting modules 751 and 753 may be further adapted to transmit information to the wireless device comprising the value Nmin.

The network node 120 may further comprise an adapting module for adapting a scheduling scheme for the wireless device based on the minimum number of uplink feedback signals that the wireless device shall transmit in response to downlink data during the time period, and a scheduling module for scheduling the wireless device using the adapted scheduling scheme. The network node may also comprise a further module for adapting one or more parameters of the flexible subframe allocation scheme based on the minimum number of subframes in which the wireless device can be scheduled with downlink data during the time period, wherein the transmitting modules 751 and 753 may be adapted to transmit configuration information to the wireless device which configures the wireless device to operate with the adapted flexible subframe allocation scheme.

In still another alternative way to describe the embodiment in FIG. 7b, the network node 120 may comprise a Central Processing Unit (CPU) which may be a single unit or a plurality of units. Furthermore, the network node 120 may comprise at least one computer program product (CPP) 792 with a computer readable medium 793 in the form of a non-volatile memory, e.g. an EEPROM (Electrically Erasable Programmable Read-Only Memory), a flash memory or a disk drive. The CPP 792 may comprise a computer program 791 stored on the computer readable medium 793, which comprises code means which when run on the CPU of the network node 120 causes the network node 120 to perform the methods described earlier in conjunction with FIGS. 6a-b. In other words, when said code means are run on the CPU, they correspond to the processing module 750 in FIG. 7b.

Embodiments of Methods and Apparatus Described with Reference to FIGS. 3a, 3b, 4a and 4b

Figure 3A:
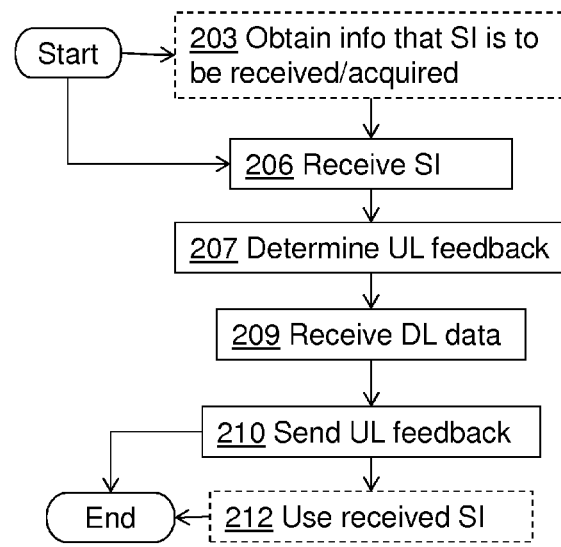
FIG. 3a is a flowchart illustrating an exemplifying method in the wireless device according to some embodiments of the present invention.

In FIG. 3a, an exemplifying, schematic flowchart of the method in the wireless device 110 is shown. FIG. 3a describes the actions performed by the wireless device 110 in FIG. 2 (see above for the descriptions of the actions). The actions of the flowchart may be performed in any suitable order.

Figure 3B:
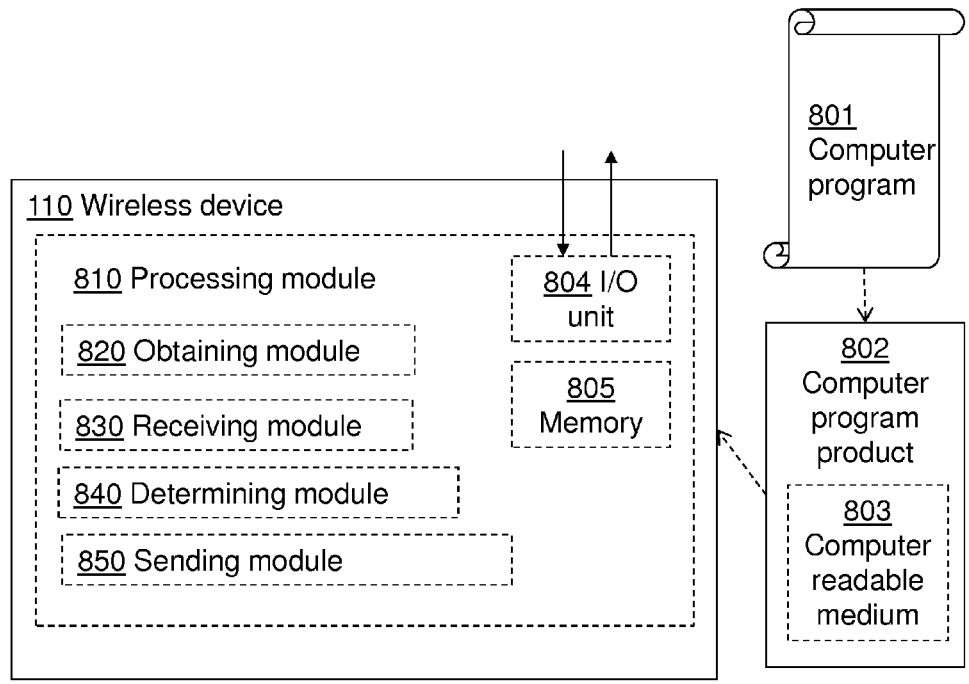
FIG. 3b is a block diagram schematically illustrating the wireless device according to some embodiments of the present invention.

With reference to FIG. 3b, a schematic block diagram of the wireless device 110 is shown. The wireless device 110 is configured to perform the methods in FIG. 2 and FIG. 3a. According to some embodiments herein, the wireless device 110 may comprise a processing module 810. In further embodiments, the processing module 810 may comprise one or more of an obtaining module 820, a receiving module 830, a determining module 840 and a sending module 850. The wireless device 110 may further comprise an Input/output (I/O) unit 804 configured to send and/or receive the DL data, the SI, configurations described herein, messages, values, indications and the like as described herein. The I/O unit 804 may comprise the receiving module 830, the sending module 850, a transmitter and/or a receiver. Furthermore, the wireless device 110 may comprise a memory 805 for storing software to be executed by, for example, the processing module when the processing module is implemented as a hardware module comprising at least one processor or the like.

FIG. 3b also illustrates software in the form of a computer program 801, comprising computer readable code units which when executed on the wireless device 110 causes the wireless device 110 to perform the method according to FIGS. 2 and/or 7. Finally, FIG. 3b illustrates a computer program product 802, comprising computer readable medium 803 and the computer program 801 as described directly above stored on the computer readable medium 803.

Figure 4A:
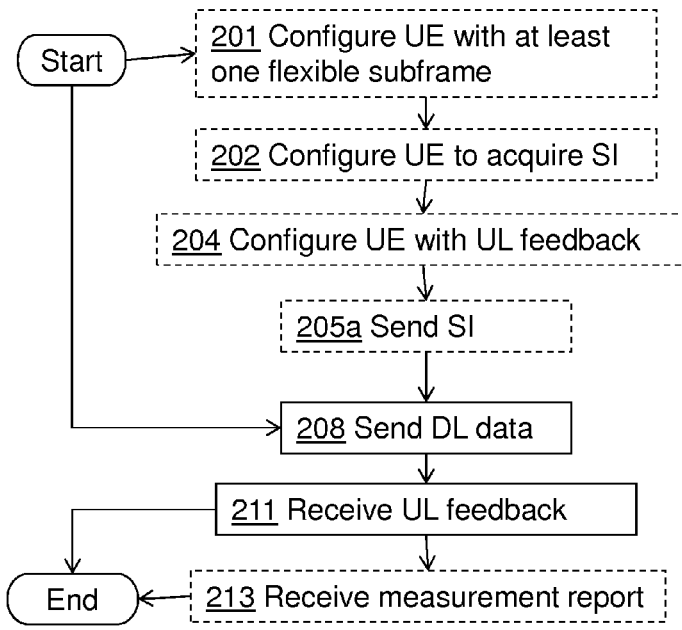
FIG. 4a is a flowchart illustrating an exemplifying method in the network node according to some embodiments of the present invention.

In FIG. 4a, an exemplifying, schematic flowchart of the method in the first network node 120 is shown. FIG. 4a describes the actions performed by the first network node 120 in FIG. 2 (see above for the descriptions of the actions). The actions of the flowchart may be performed in any suitable order.

Figure 4B:
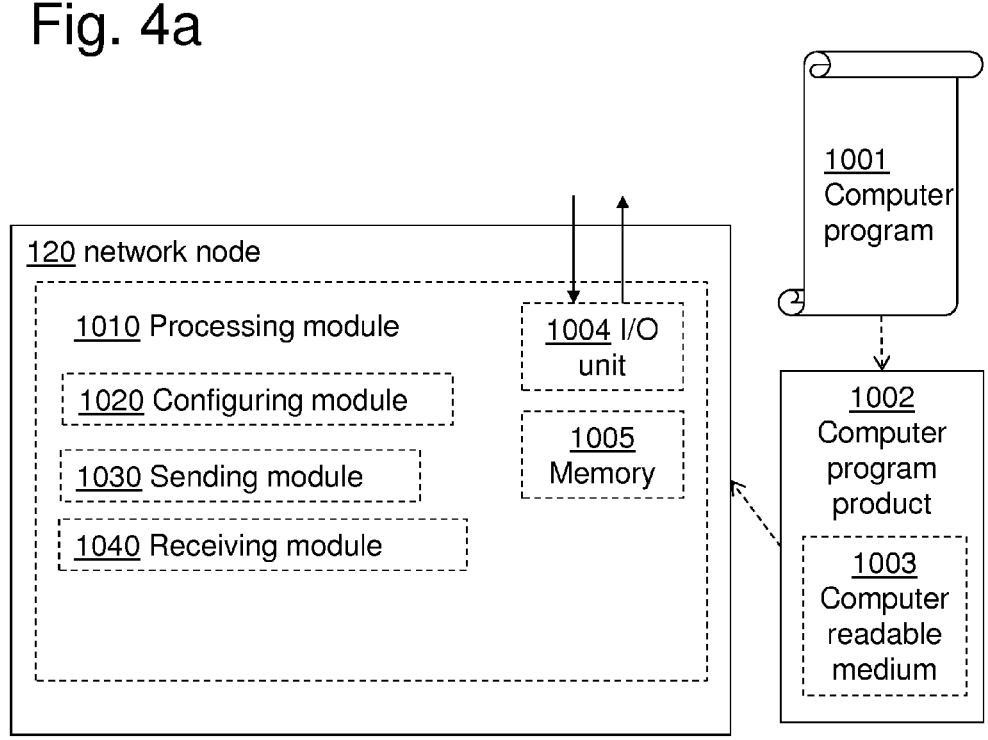
FIG. 4b is a block diagram schematically illustrating the wireless device according to some embodiments of the present invention.

With reference to FIG. 4b, a schematic block diagram of the first network node 120 is shown. The first network node 120 is configured to perform the methods in FIGS. 2 and 4a.

According to some embodiments herein, the first network node 120 may comprise a processing module 1010. In further embodiments, the processing module 1010 may comprise one or more of a configuring module 1020, a sending module 1030, a receiving module 1040.

The first network node 120 may further comprise an Input/output (I/O) unit 1004 configured to send and/or receive the DL data, the SI, configurations described herein, messages, values, indications and the like as described herein. The I/O unit 1004 may comprise the receiving module 1040, the sending module 1030, a transmitter and/or a receiver.

Furthermore, the first network node 120 may comprise a memory 1005 for storing software to be executed by, for example, the processing module when the processing module is implemented as a hardware module comprising at least one processor or the like.

FIG. 4b also illustrates software in the form of a computer program 1001, comprising computer readable code units which when executed on the first network node 120 causes the first network node 120 to perform the method according to FIGS. 2 and/or 9.

Finally, FIG. 4b illustrates a computer program product 1002, comprising computer readable medium 1003 and the computer program 1001 as described directly above stored on the computer readable medium 1003.

Listing of Non-Limiting Examples of the Method Performed by the UE

1. A method, in a UE served by a first network node operating a first cell, for acquiring SI of a second cell operated by a second network node, the method comprising:
    Creating autonomous gaps for acquiring the SI of the second cell during a time period (T0);
    Determining a minimum number of UL feedback signals that the UE is required to transmit in response to continuous transmission of DL data to the UE by the first network node during the time period, e.g. T0;
        wherein the minimum number of UL feedback signals to be transmitted is associated with a dynamic or flexible subframe allocation scheme; and
        wherein the at least one subframe number is changeable between at least any two of the UL, DL and special subframes during the time period, e.g. T0 according to the scheme;
    Transmitting the determined minimum number of UL feedback signals in response to the continuous transmission of DL data during the time period, e.g. T0.
2. The method according to example 1, wherein the second cell is a neighbor cell of the first cell or the second cell is the same as the first cell.
3. The method according to any of the preceding examples, wherein the SI comprises of at least one of MIB, SIB1 and CGI.
4. The method according to any of the preceding examples, wherein the UL feedback signal is ACK and NACK transmitted in response to receiving DL data channel.
5. The method according to any of the preceding examples, wherein DL data channel is PDSCH.
6. The method according to any of the preceding examples, wherein the dynamic or flexible subframe allocation scheme further comprises of any of:
    HD-FDD operation, wherein UL and DL subframes do not overlap in time but they are transmitted on different carrier frequencies, and the at least one subframe changes between at least any two of UL, DL and unused subframes during the time period, e.g. T0;
    Dynamic TDD wherein at least one subframe changes between at least any two of UL subframe, DL subframe and special subframe during the time period, e.g. T0.
7. The method according to any of the preceding examples, wherein the dynamic TDD comprises operating by using at least two different UL and DL TDD configuration during the time period, e.g. T0.
8. The method according to any of the preceding examples, wherein receiving a request from the first network node to acquire the SI of the second cell.
9. The method according to any of the preceding examples, wherein the UE configuration during at least part of T0 further comprises of one or more of the following:
UE is NOT configured with a measurement gap;
UE is NOT configured with any DRX cycle or UE is not operating in DRX,
UE is configured to receive DL data from the first network node with a pre-defined number of code word in one subframe and
No MBSFN subframe is configured in serving cell (or PCell)
10. The method according to any of the preceding examples, wherein acquiring the SI of the second cell during the time period, e.g. T0 using the autonomous gap.
11. The method according to any of the preceding examples, wherein using the acquired SI of the second cell for at least one of:
Signaling the acquired SI to the first network node or to another UE;
Storing the acquired SI in the memory for use at future time, and
Comparing the CGI in the SI with the PCI for verifying the identification of the second cell.
12. The method according to any of the preceding examples, wherein determining the said minimum number of UL feedback signals that are required to be transmitted based on one of:
Received indication from the first network node;
Pre-defined information.
13. The method according to example 11, wherein pre-defined information comprises one of:
Pre-defined number of UL signals required to be transmitted;
Pre-defined rule; and
Pre-defined expression or function

EXAMPLE IMPLEMENTATIONS

A. First Example

According to section 8.1.2.2.4 of TS 36.133 Rel-12, version 12.2.0, *E-UTRAN TDD intra frequency measurements with autonomous gaps*, the UE has to be compliant to, or obey, a set of rules as described in the following.
Identification of a New CGI of E-UTRA Cell with Autonomous Gaps
No explicit neighbour list is provided to the UE for identifying a new CGI of E-UTRA cell. The UE shall identify and report the CGI when requested by the network for the purpose 'reportCGI'. The UE may make autonomous gaps in downlink reception and UL transmission for receiving MIB and SIB1 messages according to clause 5.5.3.1 of TS 36.331. Note that a UE is not required to use autonomous gap if si-RequestForHO is set to false. If autonomous gaps are used for measurement with the purpose of 'reportCGI', the UE shall be able to identify a new CGI of E-UTRA cell within:

$$T_{identify\_CGI,\ intra} = T_{basic\_identify\_CGI,\ intra}\ ms$$

where
$T_{basic\_identify\_CGI,\ intra}$ =150 ms. This is the time period used in the above equation where the maximum allowed time for the UE to identify a new CGI of an E-UTRA cell is defined, provided that the E-UTRA cell has been already identified by the UE.

A cell shall be considered identifiable when the following conditions are fulfilled:
RSRP related side conditions are fulfilled for a corresponding Band,
SCH_RP and SCH Ês/Iot for a corresponding Band
The MIB of an E-UTRA cell whose CGI is identified shall be considered decodable by the UE provided certain PBCH demodulation requirements are met (e.g. under certain SNR level).

The requirement for identifying a new CGI of an E-UTRA cell within $T_{basic\_identify\_CGI,\ intra}$ is applicable when no DRX is used as well as when all the DRX cycles specified in TS 36.331 are used.

Within the time, where $T_{identify\_CGI,\ ultra}$ ms, over which the UE identifies the new CGI of E-UTRA cell, the UE shall be able to transmit at least the number of ACK/NACKs stated in Table 2 (same as Table 2 in background section) provided that:
there is continuous DL data allocation,
no DRX cycle is used,
no measurement gaps are configured,
only one code word is transmitted in each subframe

TABLE 2

(replica of Table 2 in background section): Requirement on minimum number of ACK/NACKs to transmit during $T_{basic\_identify\_CGI,intra}$.

| UL/DL configuration | Minimum number of transmitted ACK/NACKs |
|---|---|
| 0 | 18 |
| 1 | 35 |
| 2 | 43 |
| 3 | 36 |
| 4 | 39 |
| 5 | 42 |
| 6 | 30 |

ECGI Reporting Delay
The ECGI reporting delay occurs due to the delay uncertainty when inserting the ECGI measurement report to the TTI of the UL DCCH. The delay uncertainty is twice the TTI of the UL DCCH. In case DRX is used, the ECGI reporting may be delayed until the next DRX cycle. If IDC autonomous denial is configured, an additional delay can be expected.
Requirement on UE for this First Example According to Embodiments of Invention
However according to embodiments of the invention, if at least one flexible subframe is used in the PCell of the UE within the time, $T_{identify\_CGI,\ intra}$ ms, over which the UE identifies the new CGI of E-UTRA cell, then the UE shall be able to transmit at least 18 ACK/NACKs provided that:
there is continuous DL data allocation,
no DRX cycle is used,
no measurement gaps are configured,
only one code word is transmitted in each subframe and
no MBSFN subframe is configured in the PCell.

B. Second Example

According to section 8.1.2.3.6 of TS 36.133 Rel-12, version 12.2.0, *E-UTRAN TDD-FDD inter frequency measurements using autonomous gaps*, the UE has to be compliant to, or obey, a set of rules as described in the following.

The requirements in this clause shall apply to a UE supporting FDD and TDD.

Identification of a New CGI of E-UTRA FDD Cell with Autonomous Gaps

No explicit neighbour list is provided to the UE for identifying a new CGI of E-UTRA cell. The UE shall identify and report the CGI when requested by the network for the purpose of 'reportCGI'. The UE may make autonomous gaps in both downlink reception and UL transmission for receiving MIB and SIB1 message according to clause 5.5.3.1 of TS 36.331. Note that a UE is not required to use autonomous gap if si-RequestForHO is set to false. If autonomous gaps are used for measurement with the purpose of 'reportCGI', regardless of whether DRX is used or not, the UE shall be able to identify a new CGI of E-UTRA cell within:

$$T_{identify\_CGI,\ inter} = T_{basic\_identify\_CGI,\ inter}\ ms$$

Where
  $T_{basic\_identify\_CGI,\ inter} = 150$ ms. This is the time period used in the above equation where the maximum allowed time for the UE to identify a new CGI of E-UTRA cell is defined, provided that the E-UTRA cell has been already identified by the UE.

A cell shall be considered identifiable when the following conditions are fulfilled:
  RSRP related side conditions are fulfilled for a corresponding Band,
  $SCH\_RP|_{dBm}$ and SCH Ês/Iot for a corresponding Band.

The MIB of an E-UTRA cell whose CGI is identified shall be considered decodable by the UE provided certain PBCH demodulation requirements are met (e.g. under certain SNR level).

The requirement for identifying a new CGI of an E-UTRA cell within $T_{basic\_identify\_CGI,inter}$ is applicable when no DRX is used as well as when all the DRX cycles specified in TS 36.331 are used.

Given that continuous DL data allocation and no DRX is used, no measurement gaps are configured, and TDD configuration as specified in TS 36.331 is used, the UE shall have more than 30 ACK/NACK transmitted during the identification of a new CGI of E-UTRA cell.

ECGI Reporting Delay

The ECGI reporting delay occurs due to the delay uncertainty when inserting the ECGI measurement report to the TTI of the UL DCCH. The delay uncertainty is twice the TTI of the UL DCCH. In case DRX is used, the ECGI reporting may be delayed until the next DRX cycle. If IDC autonomous denial is configured, an additional delay can be expected.

Requirement on UE for this Second Example According to Embodiments of Invention

However according to embodiments of the invention, if at least one flexible subframe is used in the PCell of the UE within the time, $T_{identify\_CGI,\ inter}$ ms, over which the UE identifies the new CGI of E-UTRA cell, then the UE shall be able to transmit at least 18 ACK/NACKs provided that:
  there is continuous DL data allocation,
  no DRX cycle is used,
  no measurement gaps are configured,
  only one code word is transmitted in each subframe and no MBSFN subframe is configured in the PCell.

C. Third Example

According to section 8.1.2.3.7 of TS 36.133 Rel-12, version 12.2.0, *E-UTRAN TDD-TDD inter frequency measurements with autonomous gaps*, the UE has to be compliant to, or obey, a set of rules as described in the following.

Identification of a New CGI of E-UTRA TDD Cell with Autonomous Gaps

No explicit neighbour list is provided to the UE for identifying a new CGI of E-UTRA cell. The UE shall identify and report the CGI when requested by the network for the purpose of 'reportCGI'. The UE may make autonomous gaps in both downlink reception and UL transmission for receiving MIB and SIB1 message according to clause 5.5.3.1 of TS 36.331. Note that a UE is not required to use autonomous gap if si-RequestForHO is set to false. If autonomous gaps are used for measurement with the purpose of 'reportCGI', regardless of whether DRX is used or not, the UE shall be able to identify a new CGI of E-UTRA cell within:

$$T_{identify\_CGI,\ inter} = T_{basic\_identify\_CGI,\ inter}\ ms$$

Where
  $T_{basic\_identify\_CGI,\ inter} = 150$ ms. This is the time period used in the above equation where the maximum allowed time for the UE to identify a new CGI of E-UTRA cell is defined, provided that the E-UTRA cell has been already identified by the UE.

A cell shall be considered identifiable when the following conditions are fulfilled:
  RSRP related side conditions are fulfilled for a corresponding Band,
  SCH_RP and SCH Ês/Iot for a corresponding Band.

The MIB of an E-UTRA cell whose CGI is identified shall be considered decodable by the UE provided certain PBCH demodulation requirements are met (e.g. under certain SNR level).

The requirement for identifying a new CGI of an E-UTRA cell within $T_{basic\_identify\_CGI,inter}$ is applicable when no DRX is used as well as when all the DRX cycles specified in TS 36.331 are used.

Given that continuous DL data allocation and no DRX is used, no measurement gaps are configured, and TDD configuration as specified in TS 36.331 is used, the UE shall have more than 30 ACK/NACKs transmitted during the identification of a new CGI of E-UTRA cell.

ECGI Reporting Delay

The ECGI reporting delay occurs due to the delay uncertainty when inserting the ECGI measurement report to the TTI of the UL DCCH. The delay uncertainty is twice the TTI of the UL DCCH. In case DRX is used, the ECGI reporting may be delayed until the next DRX cycle. If IDC autonomous denial is configured, an additional delay can be expected.

Requirement on UE for this Third Example According to Embodiments of Invention

However according to embodiments of the invention, if at least one flexible subframe is used in the PCell of the UE within the time, $T_{basic\_identify\_CGI,inter}$ ms, over which the UE identifies the new CGI of E-UTRA cell, then the UE shall be able to transmit at least 18 ACK/NACKs provided that:
  there is continuous DL data allocation,
  no DRX cycle is used,
  no measurement gaps are configured,
  only one code word is transmitted in each subframe and no MBSFN subframe is configured in the PCell.

TERMINOLOGY

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

ABBREVIATIONS

BCH Broadcast channel
BS Base Station
CA Carrier Aggregation
CGI Cell global identifier
CPICH Common Pilot Channel
DL Downlink
DRX Discontinuous Reception
EARFCN Evolved absolute radio frequency channel number
ECGI E-UTRAN CGI
E-CID Enhanced cell ID
E-SMLC Evolved SMLC
E-UTRAN Evolved Universal Terrestrial Radio Access Network
GSM Global System for Mobile Communications
HARQ Hybrid Automatic Repeat Request
L1 Layer 1
L2 Layer 2
LMU Location measurement unit
LPP LTE positioning protocol
LPPa LTE positioning protocol annex
LTE Long Term Evolution
MAC Medium Access Control
MBSFN Multimedia Broadcast multicast service Single Frequency Network
MIB Master Information Block
MME Mobility management entity
OFDM Orthogonal Frequency Division Modulation
OFDMA Orthogonal Frequency Division Multiple Access
O&M Operational and Maintenance
OTDOA Observed time difference of arrival
PBCH Physical Broadcast Channel
PCI Physical cell identifier
PDSCH Physical Downlink Shared Channel
RAT Radio Access Technology
RN Relay node
RNC Radio Network Controller
RRC Radio Resource Control
RSCP Received Signal Code Power
RSRQ Reference signal received quality
RSRP Reference signal received power
RSTD Reference signal time difference
SMLC Serving Mobile Location Center
SON Self Organizing Network
RSSI Received signal strength indicator
SIB System information block
SI System information
UE User Equipment
UL Uplink
UTDOA UL time difference of arrival
X2—an interface for BS-to-BS communication in LTE

The invention claimed is:

1. A method performed in a wireless device located in a first cell operated by a network node of a wireless communication system, the method comprising:
    acquiring system information of a second cell using at least one autonomous gap during a time period, wherein the wireless device is configured with a flexible subframe allocation scheme in the first cell during at least a part of the time period;
    obtaining a value Nmin corresponding to a minimum number of uplink feedback signals, where the value Nmin is associated with the flexible subframe allocation scheme; and
    transmitting at least the minimum number Nmin of uplink feedback signals in response to continuous downlink data received from the network node in the first cell during the time period.

2. The method according to claim 1, further comprising:
    receiving a request from the network node to report the system information of the second cell, wherein the system information is acquired in response to the request.

3. The method according to claim 1, further comprising:
    transmitting the acquired system information to the network node.

4. The method according to claim 1, wherein the system information comprises information uniquely identifying the second cell.

5. The method according to claim 1, wherein the uplink feedback signals are transmitted in the first cell in response to continuous downlink data received from the network node in the first cell.

6. The method according to claim 1, wherein obtaining the value Nmin comprises one of:

receiving information from the network node comprising the value Nmin;
retrieving the value Nmin stored in the wireless device; and
deriving the value Nmin based on a pre-defined rule, expression or function.

7. The method according to claim 1, wherein the wireless device is configured with the flexible subframe allocation scheme, based on configuration information received from the network node.

8. The method according to claim 1, wherein the first cell is one of the following: a serving cell, a PCell in multi-carrier operation, or a SCell in multi-carrier operation.

9. The method according to claim 1, wherein the flexible subframe allocation scheme is a dynamic Time Division Duplex (TDD) or a Half Duplex Frequency Division Duplex (HD-FDD) subframe allocation scheme.

10. The method according to claim 1, wherein the uplink feedback signals comprise acknowledgement and non-acknowledgement signals as part of hybrid automatic retransmission request feedback.

11. A method performed in a network node of a wireless communication system operating a first cell, wherein a wireless device is served by the first cell, the method comprising:
transmitting configuration information to the wireless device, configuring the wireless device to operate with a flexible subframe allocation scheme in the first cell during at least part of a time period during which the wireless device acquires system information of a second cell;
obtaining a value Nmin associated with the flexible subframe allocation scheme, the value Nmin corresponding to a minimum number of uplink feedback signals that the wireless device shall transmit in response to continuous downlink data during the time period;
transmitting continuous downlink data to the wireless device in the first cell during the time period; and
receiving at least the minimum number Nmin of uplink feedback signals in the first cell in response to the transmitted continuous downlink data.

12. The method according to claim 11, further comprising:
transmitting a request to the wireless device to report the system information of the second cell.

13. The method according to claim 11, further comprising:
receiving system information of the second cell from the wireless device.

14. The method according to claim 11, wherein the system information comprises information uniquely identifying the second cell.

15. The method according to claim 11, further comprising:
transmitting information to the wireless device comprising the value Nmin.

16. The method according to claim 11, wherein the first cell is a PCell in multi-carrier operation or a SCell in multi-carrier operation.

17. The method according to claim 11, wherein the flexible subframe allocation scheme is a dynamic Time Division Duplex (TDD) or a Half Duplex Frequency Division Duplex (HD-FDD) subframe allocation scheme.

18. The method according to claim 11, wherein the uplink feedback signals comprise acknowledgement and non-acknowledgement signals as part of hybrid automatic retransmission request feedback.

19. The method according to claim 11, wherein obtaining the value Nmin comprises one of:
retrieving the value Nmin stored in the network node;
determining the value Nmin based on a pre-defined rule, expression or function; and
determining the value Nmin based on an amount of data associated with the wireless device in a buffer of the network node.

20. The method according to claim 11, further comprising:
adapting a scheduling scheme for the wireless device based on the minimum number of uplink feedback signals that the wireless device shall transmit in response to continuous downlink data during the time period; and
scheduling the wireless device using the adapted scheduling scheme.

21. The method according to claim 11, further comprising:
adapting one or more parameters of the flexible subframe allocation scheme based on the minimum number of subframes in which the wireless device can be scheduled with continuous downlink data during the time period;
and wherein the configuration information transmitted to the wireless device configures the wireless device to operate with the adapted flexible subframe allocation scheme.

22. A wireless device configured to, when located in a first cell operated by a network node of a wireless communication system:
acquire system information of a second cell using at least one autonomous gap during a time period, wherein the wireless device is configured with a flexible subframe allocation scheme in the first cell during at least a part of the time period;
obtain a value Nmin corresponding to a minimum number of uplink feedback signals, where the value Nmin is associated with the flexible subframe allocation scheme; and
transmit at least the minimum number Nmin of uplink feedback signals in response to continuous downlink data received from the network node in the first cell during the time period.

23. The wireless device according to claim 22, configured to:
receive a request from the network node to report the system information of the second cell; and
acquire the system information in response to the request.

24. The wireless device according to claim 22, configured to:
transmit the acquired system information to the network node.

25. The wireless device according to claim 22, configured to acquire the system information comprising information uniquely identifying the second cell.

26. The wireless device according to claim 22, configured to transmit the uplink feedback signals in the first cell in response to continuous downlink data received from the network node in the first cell.

27. The wireless device according to claim 22, configured to obtain the value Nmin by one of the following:
receiving information from the network node comprising the value Nmin;
retrieving the value Nmin stored in the wireless device;
deriving the value Nmin based on a pre-defined rule, expression or function.

28. The wireless device according to claim 22, configured with the flexible subframe allocation scheme, based on configuration information received from the network node.

29. The wireless device according to claim 22, wherein the first cell is one of the following: a serving cell, a PCell in multi-carrier operation, or a SCell in multi-carrier operation.

30. The wireless device according to claim 22, wherein the flexible subframe allocation scheme is a dynamic Time Division Duplex, TDD, or a Half Duplex Frequency Division Duplex, HD-FDD subframe allocation scheme.

31. The wireless device according to claim 22, wherein the uplink feedback signals comprise acknowledgement and non-acknowledgement signals as part of hybrid automatic retransmission request feedback.

32. A network node for a wireless communication system configured to operate a first cell, wherein a wireless device is served by the first cell, the network node being configured to:
  transmit configuration information to the wireless device, configuring the wireless device to operate with a flexible subframe allocation scheme in the first cell during at least part of a time period during which the wireless device acquires system information of a second cell;
  obtain a value Nmin associated with the flexible subframe allocation scheme, the value Nmin corresponding to a minimum number of uplink feedback signals that the wireless device shall transmit in response to continuous downlink data during the time period;
  transmit continuous downlink data to the wireless device in the first cell during the time period; and
  receive at least the minimum number Nmin of uplink feedback signals in the first cell in response to the transmitted continuous downlink data.

33. The network node according to claim 32, further configured to:
  transmit a request to the wireless device to report the system information of the second cell.

34. The network node according to claim 32, further configured to:
  receive system information of the second cell from the wireless device.

35. The network node according to claim 32, wherein the system information comprises information uniquely identifying the second cell.

36. The network node according to claim 32, further configured to:
  transmit information to the wireless device comprising the value Nmin.

37. The network node according to claim 32, wherein the first cell is a PCell in multi-carrier operation or a SCell in multi-carrier operation.

38. The network node according to claim 32, wherein the flexible subframe allocation scheme is a dynamic Time Division Duplex (TDD) or a Half Duplex Frequency Division Duplex (HD-FDD) subframe allocation scheme.

39. The network node according to claim 32, wherein the uplink feedback signals comprise acknowledgement and non-acknowledgement signals as part of hybrid automatic retransmission request feedback.

40. The network node according to claim 32, configured to obtain the value Nmin by one of the following:
  retrieving the value Nmin stored in the network node;
  determining the value Nmin based on a pre-defined rule, expression or function; and
  determining the value Nmin based on an amount of data associated with the wireless device in a buffer of the network node.

41. The network node according to claim 32, further configured to:
  adapt a scheduling scheme for the wireless device based on the minimum number Nmin of uplink feedback signals that the wireless device shall transmit in response to continuous downlink data during the time period; and
  schedule the wireless device using the adapted scheduling scheme.

42. The network node according to claim 32, further configured to:
  adapt one or more parameters of the flexible subframe allocation scheme based on the minimum number of subframes in which the wireless device can be scheduled with continuous downlink data during the time period; and
  transmit configuration information to the wireless device, configuring the wireless device to operate with the adapted flexible subframe allocation scheme.

43. A non-transitory computer readable medium storing a computer program comprising computer readable code that, when executed on a processing circuit of a wireless device located in a first cell operated by a network node of a wireless communication system, causes the processing circuit to:
  acquire system information of a second cell using at least one autonomous gap during a time period, wherein the wireless device is configured to use a flexible subframe allocation scheme in the first cell during at least a part of the time period;
  obtain a value Nmin corresponding to a minimum number of uplink feedback signals, where the value Nmin is associated with the flexible subframe allocation scheme; and
  transmit at least the minimum number Nmin of uplink feedback signals in response to continuous downlink data during the time period.

44. A non-transitory computer readable medium storing a computer program comprising computer readable code that, when executed on a processing circuit of a network node of a wireless communication system configured to operate a first cell that serves a wireless device, causes the processing circuit to:
  transmit configuration information to the wireless device, configuring the wireless device to use a flexible subframe allocation scheme in the first cell during at least part of a time period during which the wireless device acquires system information of a second cell;
  obtain a value Nmin associated with the flexible subframe allocation scheme, the value Nmin corresponding to a minimum number of uplink feedback signals that the wireless device shall transmit in response to continuous downlink data during the time period;
  transmit continuous downlink data to the wireless device in the first cell during the time period; and
  receive at least the minimum number Nmin of uplink feedback signals in the first cell in response to the transmitted continuous downlink data.

* * * * *

UNITED STATES PATENT AND TRADEMARK OFFICE
CERTIFICATE OF CORRECTION

PATENT NO. : 9,974,073 B2  
APPLICATION NO. : 14/427498  
DATED : May 15, 2018  
INVENTOR(S) : Behravan et al.

It is certified that error appears in the above-identified patent and that said Letters Patent is hereby corrected as shown below:

In the Drawings

In Fig. 6b, Sheet 6 of 7, delete Step "540" and insert Step -- 650 --, therefor.

In the Specification

In Column 1, Line 57, delete "as an" and insert -- an --, therefor.

In Column 2, Line 36, delete "5, 7," and insert -- 5, 7 --, therefor.

In Column 9, Line 33, delete "(e.g. T0)." and insert -- (e.g. T0), --, therefor.

In Column 25, Line 11, delete "DRX," and insert -- DRX; --, therefor.

In Column 25, Line 14, delete "subframe and" and insert -- subframe; and --, therefor.

In Column 25, Line 26, delete "time, and" and insert -- time; and --, therefor.

In Column 26, Line 17, delete "$T_{identify\_CGI, ultra}$" and insert -- $T_{identify\_CGI, intra}$ --, therefor.

In Column 30, Line 9, delete "Modulation" and insert -- Multiplex --, therefor.

Signed and Sealed this  
Fourth Day of December, 2018

Andrei Iancu  
*Director of the United States Patent and Trademark Office*